United States Patent
Arnone et al.

(10) Patent No.: US 10,504,325 B2
(45) Date of Patent: *Dec. 10, 2019

(54) PRE-AUTHORIZED TRANSACTION INTERLEAVED WAGERING SYSTEM

(71) Applicant: Gamblit Gaming, LLC, Glendale, CA (US)

(72) Inventors: Miles Arnone, Sherborn, MA (US); Frank Cire, Pasadena, CA (US); Clifford Kaylin, Los Angeles, CA (US); Eric Meyerhofer, Pasadena, CA (US)

(73) Assignee: Gamblit Gaming, LLC, Glendale, CA (US)

(*) Notice: Subject to any disclaimer, the term of this patent is extended or adjusted under 35 U.S.C. 154(b) by 806 days.

This patent is subject to a terminal disclaimer.

(21) Appl. No.: 15/060,502

(22) Filed: Mar. 3, 2016

(65) Prior Publication Data

US 2016/0189479 A1  Jun. 30, 2016

Related U.S. Application Data

(63) Continuation of application No. PCT/US2014/053950, filed on Sep. 3, 2014.

(60) Provisional application No. 61/873,307, filed on Sep. 3, 2013.

(51) Int. Cl.
*G07F 17/32* (2006.01)
*A63F 13/792* (2014.01)
*A63F 13/352* (2014.01)

(52) U.S. Cl.
CPC ........ *G07F 17/3244* (2013.01); *A63F 13/352* (2014.09); *A63F 13/792* (2014.09); *G07F 17/3227* (2013.01); *G07F 17/3267* (2013.01); *G07F 17/3295* (2013.01)

(58) Field of Classification Search
CPC ............. G07F 17/3225; G07F 17/3227; G07F 17/326; G07F 17/3262; G07F 17/3267
See application file for complete search history.

(56) References Cited

U.S. PATENT DOCUMENTS

| | | | |
|---|---|---|---|
| 5,413,357 A | 5/1995 | Schulze et al. |
| 5,718,429 A | 2/1998 | Keller |
| 5,785,592 A | 7/1998 | Jacobsen |
| 5,853,324 A | 12/1998 | Kami et al. |
| 5,963,745 A | 10/1999 | Collins et al. |
| 6,050,895 A | 4/2000 | Luciano |

(Continued)

FOREIGN PATENT DOCUMENTS

WO    2003042830 A1    5/2003

OTHER PUBLICATIONS

U.S. Appl. No. 14/815,764 Arnone, et al. filed Jul. 31, 2015.

(Continued)

*Primary Examiner* — Steven J Hylinski
(74) *Attorney, Agent, or Firm* — Frank Cire

(57) ABSTRACT

Systems and methods for operating a pre-authorized transaction interleaved wagering system are disclosed. A pre-authorized transaction interleaved wagering system uses pre-determined unique pre-authorized transaction identifiers to track transactions between and entertainment game and a game world controller that manages wager decisions within the pre-authorized transaction interleaved wagering system.

10 Claims, 16 Drawing Sheets

(56) References Cited

U.S. PATENT DOCUMENTS

| | | | |
|---|---|---|---|
| 6,104,815 A | 8/2000 | Alcorn et al. | |
| 6,165,071 A | 12/2000 | Weiss | |
| 6,227,974 B1 | 5/2001 | Eilat | |
| 6,267,669 B1 | 7/2001 | Luciano | |
| 6,685,563 B1 | 2/2004 | Meekins et al. | |
| 6,712,693 B1 | 3/2004 | Hettinger | |
| 6,761,632 B2 | 7/2004 | Bansemer et al. | |
| 6,761,633 B2 | 7/2004 | Riendeau | |
| 6,764,397 B1 | 7/2004 | Robb | |
| 6,811,482 B2 | 11/2004 | Letovsky | |
| 7,118,105 B2 | 10/2006 | Benevento | |
| 7,294,058 B1 | 11/2007 | Slomiany | |
| 7,326,115 B2 | 2/2008 | Baerlocher | |
| 7,361,091 B2 | 4/2008 | Letovsky | |
| 7,517,282 B1 | 4/2009 | Pryor | |
| 7,575,517 B2 | 8/2009 | Parham et al. | |
| 7,682,239 B2 | 3/2010 | Friedman et al. | |
| 7,720,733 B2 | 5/2010 | Jung | |
| 7,753,770 B2 | 7/2010 | Walker et al. | |
| 7,753,790 B2 | 7/2010 | Nguyen | |
| 7,766,742 B2 | 8/2010 | Bennett et al. | |
| 7,775,885 B2 | 8/2010 | Van Luchene | |
| 7,798,896 B2 | 9/2010 | Katz | |
| 7,828,657 B2 | 11/2010 | Booth | |
| 7,917,371 B2 | 3/2011 | Jung et al. | |
| 7,931,531 B2 | 4/2011 | Oberberger | |
| 7,938,727 B1 | 5/2011 | Konkle | |
| 7,950,993 B2 | 5/2011 | Oberberger | |
| 7,967,674 B2 | 6/2011 | Baerlocher | |
| 7,980,948 B2 | 7/2011 | Rowe | |
| 7,996,264 B2 | 8/2011 | Kusumoto et al. | |
| 8,012,023 B2 | 9/2011 | Gates | |
| 8,047,908 B2 | 11/2011 | Walker | |
| 8,047,915 B2 | 11/2011 | Lyle | |
| 8,060,829 B2 | 11/2011 | Jung et al. | |
| 8,075,383 B2 | 12/2011 | Friedman et al. | |
| 8,087,999 B2 | 1/2012 | Oberberger | |
| 8,113,938 B2 | 2/2012 | Friedman et al. | |
| 8,118,654 B1 | 2/2012 | Nicolas | |
| 8,128,487 B2 | 3/2012 | Hamilton et al. | |
| 8,135,648 B2 | 3/2012 | Oram | |
| 8,137,193 B1 | 3/2012 | Kelly et al. | |
| 8,142,272 B2 | 3/2012 | Walker | |
| 8,157,653 B2 | 4/2012 | Buhr | |
| 8,167,699 B2 | 5/2012 | Inamura | |
| 8,177,628 B2 | 5/2012 | Manning | |
| 8,182,338 B2 | 5/2012 | Thomas | |
| 8,182,339 B2 | 5/2012 | Anderson | |
| 8,187,068 B2 | 5/2012 | Slomiany | |
| 8,206,210 B2 | 6/2012 | Walker | |
| 8,308,544 B2 | 11/2012 | Friedman | |
| 8,430,735 B2 | 4/2013 | Oberberger | |
| 8,475,266 B2 | 7/2013 | Arnone | |
| 8,480,470 B2 | 7/2013 | Napolitano et al. | |
| 8,510,567 B2 | 8/2013 | Alderucci et al. | |
| 8,622,809 B1 | 1/2014 | Arora et al. | |
| 8,864,564 B2 | 10/2014 | Oberberger | |
| 2001/0004609 A1 | 6/2001 | Walker et al. | |
| 2001/0019965 A1 | 9/2001 | Ochi | |
| 2002/0022509 A1 | 2/2002 | Nicastro et al. | |
| 2002/0090990 A1 | 7/2002 | Joshi et al. | |
| 2002/0132660 A1* | 9/2002 | Taylor | G07F 17/32 463/16 |
| 2002/0175471 A1 | 11/2002 | Faith | |
| 2003/0060286 A1 | 3/2003 | Walker et al. | |
| 2003/0119576 A1 | 6/2003 | McClintic et al. | |
| 2003/0139214 A1 | 7/2003 | Wolf et al. | |
| 2003/0171149 A1 | 9/2003 | Rothschild | |
| 2003/0204565 A1 | 10/2003 | Guo et al. | |
| 2003/0211879 A1 | 11/2003 | Englman | |
| 2004/0092313 A1 | 5/2004 | Saito et al. | |
| 2004/0097610 A1 | 5/2004 | Saito | |
| 2004/0102238 A1 | 5/2004 | Taylor | |
| 2004/0121839 A1 | 6/2004 | Webb | |
| 2004/0225387 A1 | 11/2004 | Smith | |
| 2005/0003878 A1 | 1/2005 | Updike | |
| 2005/0005127 A1* | 1/2005 | Rowe | G07F 17/32 713/182 |
| 2005/0096124 A1 | 5/2005 | Stronach | |
| 2005/0101383 A1 | 5/2005 | Wells | |
| 2005/0116411 A1 | 6/2005 | Herrmann et al. | |
| 2005/0137006 A1 | 6/2005 | Rothschild et al. | |
| 2005/0192087 A1 | 9/2005 | Friedman et al. | |
| 2005/0233791 A1 | 10/2005 | Kane | |
| 2005/0233806 A1 | 10/2005 | Kane et al. | |
| 2005/0239538 A1 | 10/2005 | Dixon | |
| 2005/0269778 A1 | 12/2005 | Samberg | |
| 2005/0288101 A1 | 12/2005 | Lockton et al. | |
| 2006/0003823 A1 | 1/2006 | Zhang | |
| 2006/0003830 A1 | 1/2006 | Walker et al. | |
| 2006/0035696 A1 | 2/2006 | Walker | |
| 2006/0040735 A1 | 2/2006 | Baerlocher | |
| 2006/0068913 A1 | 3/2006 | Walker et al. | |
| 2006/0084499 A1 | 4/2006 | Moshal | |
| 2006/0084505 A1 | 4/2006 | Yoseloff | |
| 2006/0095790 A1 | 5/2006 | Nguyen et al. | |
| 2006/0135250 A1 | 6/2006 | Rossides | |
| 2006/0154710 A1 | 7/2006 | Serafat | |
| 2006/0166729 A1 | 7/2006 | Saffari et al. | |
| 2006/0189371 A1 | 8/2006 | Walker et al. | |
| 2006/0223611 A1 | 10/2006 | Baerlocher | |
| 2006/0234791 A1 | 10/2006 | Nguyen et al. | |
| 2006/0240890 A1 | 10/2006 | Walker | |
| 2006/0246403 A1 | 11/2006 | Monpouet et al. | |
| 2006/0258433 A1 | 11/2006 | Finocchio et al. | |
| 2007/0026924 A1 | 2/2007 | Taylor | |
| 2007/0035548 A1 | 2/2007 | Jung et al. | |
| 2007/0038559 A1 | 2/2007 | Jung et al. | |
| 2007/0064074 A1 | 3/2007 | Silverbrook et al. | |
| 2007/0087799 A1 | 4/2007 | Van Luchene | |
| 2007/0093299 A1 | 4/2007 | Bergeron | |
| 2007/0099696 A1 | 5/2007 | Nguyen et al. | |
| 2007/0117641 A1 | 5/2007 | Walker et al. | |
| 2007/0129149 A1 | 6/2007 | Walker | |
| 2007/0142108 A1 | 6/2007 | Linard | |
| 2007/0156509 A1 | 7/2007 | Jung et al. | |
| 2007/0167212 A1 | 7/2007 | Nguyen | |
| 2007/0167239 A1 | 7/2007 | O'Rourke | |
| 2007/0173311 A1 | 7/2007 | Morrow et al. | |
| 2007/0191104 A1 | 8/2007 | Van Luchene | |
| 2007/0202941 A1 | 8/2007 | Miltenberger | |
| 2007/0203828 A1 | 8/2007 | Jung et al. | |
| 2007/0207847 A1 | 9/2007 | Thomas | |
| 2007/0259717 A1 | 11/2007 | Mattice | |
| 2007/0293306 A1 | 12/2007 | Nee et al. | |
| 2008/0004107 A1 | 1/2008 | Nguyen et al. | |
| 2008/0014835 A1 | 1/2008 | Weston et al. | |
| 2008/0015004 A1 | 1/2008 | Gatto et al. | |
| 2008/0064488 A1 | 3/2008 | Oh | |
| 2008/0070659 A1 | 3/2008 | Naicker | |
| 2008/0070690 A1 | 3/2008 | Van Luchene | |
| 2008/0070702 A1 | 3/2008 | Kaminkow | |
| 2008/0096665 A1 | 4/2008 | Cohen | |
| 2008/0108406 A1 | 5/2008 | Oberberger | |
| 2008/0108425 A1 | 5/2008 | Oberberger | |
| 2008/0113704 A1 | 5/2008 | Jackson | |
| 2008/0119283 A1 | 5/2008 | Baerlocher | |
| 2008/0146308 A1 | 6/2008 | Okada | |
| 2008/0161081 A1 | 7/2008 | Berman | |
| 2008/0176619 A1 | 7/2008 | Kelly | |
| 2008/0191418 A1 | 8/2008 | Lutnick et al. | |
| 2008/0195481 A1 | 8/2008 | Lutnick | |
| 2008/0248850 A1 | 10/2008 | Schugar | |
| 2008/0254893 A1 | 10/2008 | Patel | |
| 2008/0274796 A1 | 11/2008 | Lube | |
| 2008/0274798 A1 | 11/2008 | Walker et al. | |
| 2008/0311980 A1 | 12/2008 | Cannon | |
| 2008/0318668 A1 | 12/2008 | Ching | |
| 2009/0011827 A1 | 1/2009 | Englman | |
| 2009/0023489 A1 | 1/2009 | Toneguzzo | |
| 2009/0023492 A1 | 1/2009 | Erfanian | |
| 2009/0061974 A1 | 3/2009 | Lutnick et al. | |
| 2009/0061975 A1 | 3/2009 | Ditchev | |
| 2009/0061991 A1 | 3/2009 | Popovich | |

(56) References Cited

U.S. PATENT DOCUMENTS

| | | |
|---|---|---|
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0275393 A1 | 11/2009 | Kisenwether |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1 | 12/2012 | Arnone et al. |
| 2013/0029760 A1 | 1/2013 | Wickett |
| 2013/0084975 A1 | 4/2013 | Erickson et al. |
| 2013/0131848 A1 | 5/2013 | Arnone et al. |
| 2013/0190074 A1 | 7/2013 | Arnone et al. |
| 2013/0260869 A1 | 10/2013 | Leandro et al. |
| 2014/0087801 A1 | 3/2014 | Nicely et al. |
| 2014/0087808 A1 | 3/2014 | Leandro et al. |
| 2014/0087809 A1 | 3/2014 | Leupp et al. |
| 2014/0357350 A1 | 12/2014 | Weingardt et al. |

OTHER PUBLICATIONS

U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
International Search Report and Written Opinion, PCT/US2014/053950, dated Dec. 9, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.

(56) References Cited

OTHER PUBLICATIONS

U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 141179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.

* cited by examiner

PRE-AUTHORIZED TRANSACTION INTERLEAVED WAGERING SYSTEM

CROSS REFERENCE TO RELATED APPLICATIONS

The current application is a continuation of Patent Cooperation Treaty Application No. PCT/US14/53950, filed Sep. 3, 2014, which claims the benefit of U.S. Provisional Patent Application No. 61/873,307, filed Sep. 3, 2013, the disclosure of which is incorporated herein by reference. The current application references Patent Cooperation Treaty Application No. PCT/US11/26768, filed Mar. 1, 2011, entitled ENRICHED GAME PLAY ENVIRONMENT (SINGLE and/or MULTIPLAYER) FOR CASINO APPLICATIONS, now U.S. Pat. No. 8,632,395 issued Jan. 21, 2014, Patent Cooperation Treaty Application No. PCT/US11/63587, filed Dec. 6, 2011, entitled ENHANCED SLOT-MACHINE FOR CASINO APPLICATIONS and published as US Patent Application Publication No. 2013/0296021 A1, and Patent Cooperation Treaty Application No. PCT/US12/58156, filed Sep. 29, 2012, filed Sep. 29, 2012, now U.S. Pat. No. 8,790,170, issued Jul. 29, 2014, and U.S. Pat. No. 8,944,899, issued Feb. 3, 2015, and US Patent Application Publication No. 2015/0141128 A1, the contents of each of which are hereby incorporated by reference.

FIELD OF THE INVENTION

Embodiments of the present invention are generally related to communications between data processing systems. More particularly, the present invention relates to the communication, utilization and processing of wagering data interleaved with non-wagering activity.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game can depend upon a player's skill with the game. Gambling games are typically not as interactive and do not include graphics as sophisticated as an entertainment game, which is a game of skill such as a video game.

SUMMARY OF THE INVENTION

Systems and methods in accordance with embodiments of the invention provide a gaming system including a real world credit controller including a real world credit meter; a random number generator; and a real world credit paytable, where the real world credit controller is configured to provide a randomly generated payout of real world credits from a wager of real world credits in a gambling game using the random number generator and the real world credit pay table; augment an amount of real world credits stored in the real world credit meter based on the randomly generated payout of real world credits to the real world credit meter; receive, from a game world operating system controller, a wagering decision to trigger the wager; determine a random number generation result based on the wagering decision to trigger the wager; and provide, to the game world operating system controller, the random number generation result based on the wagering decision to trigger the wager; a processing device configured to: monitor an interactive entertainment game for input of a game world information; monitor the interactive entertainment game for input of an initialization request wherein the initialization request is associated with a player; provide the game world information and initialization request to the game world operating system controller; a display screen configured to display at least one of a gambling game result and wager outcomes based upon the game world information; a user input device configured to receive from the player a wagering amount to use during game play; and the game world operating system controller operatively connected to the real world credit controller and operatively connected to the processing device, the game world operating system controller configured to receive, from the processing device, the initialization request, where the initialization request is associated with the player; determine whether the player is authorized to play a game, based on the initialization request; when the player is authorized, allocate one or more pre-authorized transaction identifiers for use by a game world client where the one or more pre-authorized transaction identifiers of a gaming system are used to authorize game world information received from the processing device; communicate the allocated one or more pre-authorized transaction identifiers to the game world client; receive game world information from the processing device; validate the pre-authorized transaction identifier when the received game world information is associated with the pre-authorized transaction identifier; and process the received game world information associated with the pre-authorized transaction identifier when the pre-authorized transaction identifier is validated, where the processing includes making the wagering decision; providing, to the real world credit controller, the wagering decision to trigger the wager; receiving, from the real world credit controller, the random number generation result based on the wagering decision to trigger the wager; and providing, to the processing device, the random number generation results based on the wagering decision to trigger the wager.

In some embodiments, the one or more pre-authorized transaction identifiers is a unique digital value that is generated by the game world operating system controller.

In various embodiments, the one or more pre-authorized transaction identifiers is unique over a particular domain.

In many embodiments, the particular domain is one of: an individual gaming session, the player's lifetime of gaming transactions, and all transactions.

In some embodiments, the game world operating system controller is further configured to generate a plurality of pre-authorized transaction identifiers, where the plurality of pre-authorized transaction identifiers comprises the one or more allocated pre-authorized transaction identifiers; and store the plurality of pre-authorized transaction identifiers.

In various embodiments, the generating the plurality of pre-authorized transaction identifiers is based on at least one of: a type of entertainment game being played, and the amount of real world credit that the player has committed.

In some embodiments, validating the pre-authorized transaction identifier comprises determining whether the pre-authorized transaction identifier associated with the received game world information is stored in a local data store of pre-authorized transaction identifiers of the game world operating system controller.

In many embodiments, the initialization request comprises player information associated with the player.

In various embodiments, the game world operating system controller is further constructed to determine that the game world operating system controller is coupled to an invalid entertainment game when the received pre-authorized transaction identifier cannot be validated.

In some embodiments, the game world operating system controller is further constructed to determine that the game world operating system controller is coupled to an invalid entertainment game when the received game world information is not associated with a pre-authorized transaction identifier.

DETAILED DESCRIPTION

Figure 1:
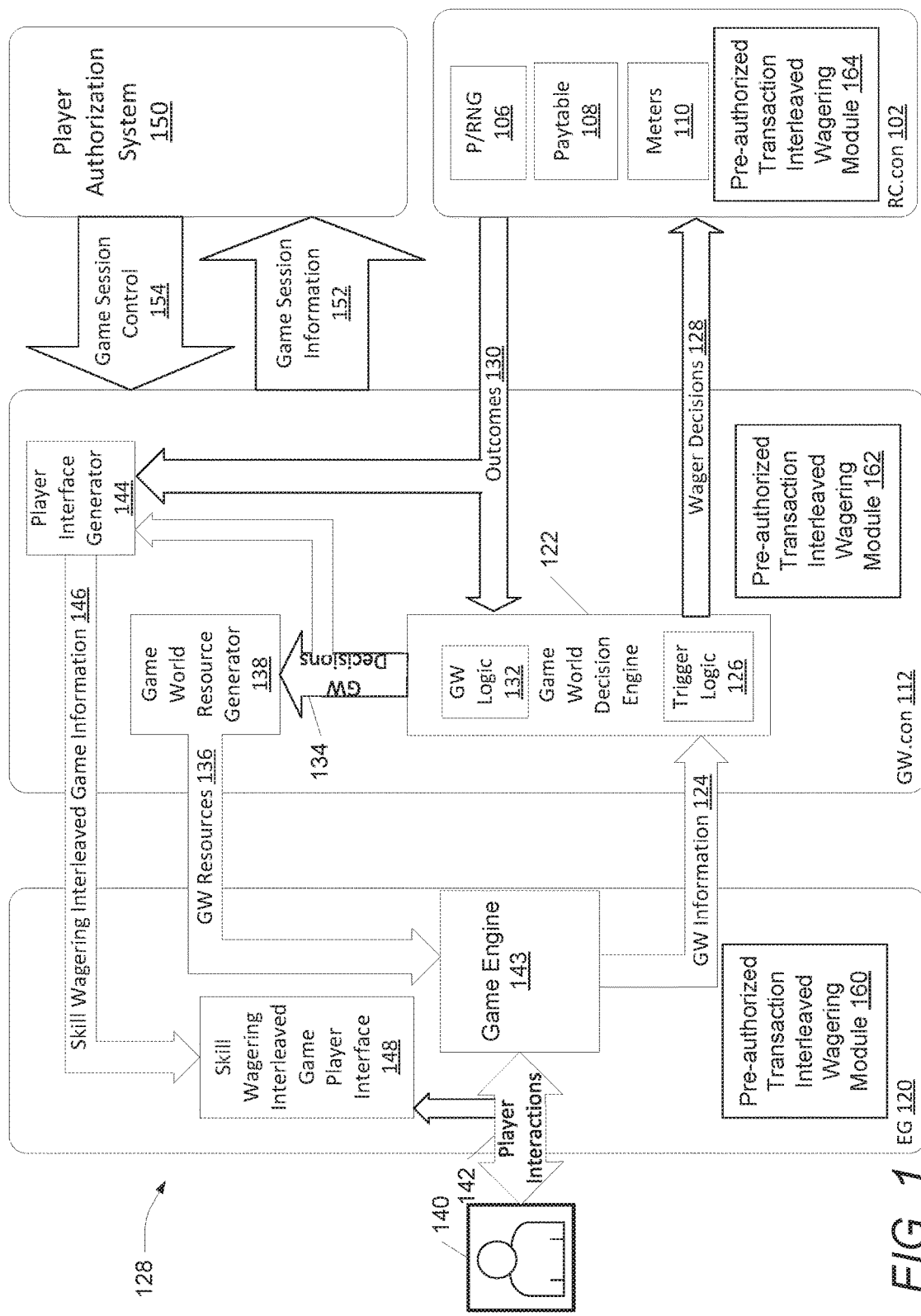
FIG. 1 illustrates a pre-authorized transaction interleaved wagering system in accordance with an embodiment of the invention.

Turning now to the drawings, systems and methods for operation of pre-authorized transaction interleaved wagering systems are illustrated. In several embodiments, a pre-authorized transaction interleaved wagering system is a system that provides a form of a combined skill and wagering game that integrates both a gambling game and a skill-based entertainment game.

In some embodiments, a plurality of wagering transactions may need to be conducted rapidly and communicated securely within the system without allowing unauthorized access to wager outcomes. Through the use of pre-authorized transaction identifiers, wagering transactions may be quickly processed by the system. In addition, associating one or more pre-computed wagering outcomes with one or more pre-authorized transaction identifiers, and then communicating only the transaction identifiers to an entertainment game, such as a device in control of a player, the wager outcomes may be pre-computed but not distributed to the entertainment game until actually needed, thus securing the pre-computed wager outcomes from tampering by the player.

In various embodiments, the gambling game is provided by a real credit controller (RC.con) which manages the gambling game. An interactive entertainment game system (Eg) executes the skill-based components of the pre-authorized transaction interleaved wagering system entertainment game for user entertainment. The Eg is operatively connected to the RC.con by a game world controller (GW.con). The GW.con manages the configuration of the pre-authorized transaction interleaved wagering system entertainment game. In certain embodiments, the pre-authorized transaction interleaved wagering system also includes a player interface that is associated with either one or both of the RC.con providing the gambling game and the Eg providing the interactive entertainment game. For purposes of the discussion, a player or player interactions are represented in a pre-authorized transaction interleaved wagering system by the electronic representation of interactions between the player and the game, typically received via the player interface, and a player profile of the pre-authorized transaction interleaved wagering system associated with the player.

In operation of a pre-authorized transaction interleaved wagering system, a player acts upon various types of elements of an interactive entertainment game in a game world environment. Elements are game world resources utilized within the interactive entertainment game to advance entertainment game gameplay. Wagers can be made in accordance with a gambling proposition on the outcome of gambling events in the gambling game as triggered by the player's use of one or more elements of the interactive entertainment game. The wagers may be made using real world credits (RC). The real world credits can be credits in a real world currency, or can be credits in a virtual currency that may or may not have a real world value. The outcomes of gambling events in the gambling game can cause consumption, loss or accrual of RC. In accordance with some embodiments, the outcomes of gambling events in the gambling game can influence elements in the interactive entertainment game such as, but not limited to: restoring a consumed element; causing the loss of an element; and restoration or placement of a fixed element.

In many embodiments, during gameplay of the interactive entertainment game using the elements, a player can optionally consume and/or accrue game world credits (GWC) within the interactive entertainment game. These GWC credits can be in the form of, but are not limited to, game world credits, experience points, and points generally. In many embodiments, a gambling proposition of a gambling game includes a wager of GWC for a randomly generated payout of interactive entertainment game GWC or elements on the outcome of a gambling event in a gambling game. The payout for a wager of entertainment game GWC or elements may include a randomly generated payout of elements in accordance with some embodiments. In a number of embodiments, an amount of GWC and/or elements used as part of a wager can have a RC value if cashed out during and/or at the end of a pre-authorized transaction interleaved wagering system gameplay session.

Elements in an interactive entertainment game include enabling elements (EE) that are game world resources utilized during the player's play of the interactive entertainment game and whose consumption by the player while playing the interactive entertainment game can trigger a wager in a gambling game. An interactive entertainment game may also have a reserve enabling element (REE), which is an element that converts into one or more enabling elements upon occurrence of a release event during pre-authorized transaction interleaved wagering system gameplay. Yet another non-limiting example of an element of an interactive entertainment game is an actionable element (AE) which is an element that is acted upon during gameplay of the interactive entertainment game to trigger a wager in the gambling game; and may or may not be restorable during normal play of the interactive entertainment game. Still another non-limiting example of an element in an interactive entertainment game is a common enabling element (CEE) which is an element that may be shared by two or more players and causes a gambling event and associated wager to be triggered in the gambling game when used by one of the players during play of the interactive entertainment game. In progressing through interactive entertainment game gameplay, elements can be utilized by a player during interactions with a controlled entity (CE). A CE is a character, entity, inanimate object, device or other object under control of a player.

In accordance with some embodiments of a pre-authorized transaction interleaved wagering system, gameplay of the interactive entertainment game progresses triggering gambling events and associated wagers on the outcome of the gambling event in a gambling game. The triggering of the gambling event and/or wager can be dependent upon a game world variable such as, but not limited to: a required game object (RGO), a required environmental condition (REC), or a controlled entity characteristic (CEC). A RGO is a specific game object in an interactive entertainment game acted upon for an AE to be completed. A non-limiting example of an RGO is a specific key needed to open a door. A REC is a game state present within an interactive entertainment game for an AE to be completed. A non-limiting example of an REC is daylight whose presence enables a character to walk through woods. A CEC is a status of the CE within an interactive entertainment game for an AE to be completed. A non-limiting example of a CEC is requirement that a CE have full health points before entering battle. Although various gameplay resources such as, but not limited to, GWC, RC and elements as discussed above may be used to trigger a gambling event and/or wager in a gambling game, one skilled in the art will recognize that any gameplay resource can be utilized to advance pre-authorized transaction interleaved wagering system gameplay as well as form the basis for a trigger of a wager as appropriate to the specification of a specific application in accordance with various embodiments of the invention. Various skill interleaved wagering games are discussed in Patent Cooperation Treaty Application No. PCT/US11/26768, filed Mar. 1, 2011, entitled ENRICHED GAME PLAY ENVIRONMENT (SINGLE and/or MULTIPLAYER) FOR CASINO APPLICATIONS, now U.S. Pat. No. 8,632,395 issued Jan. 21, 2014, and Patent Cooperation Treaty Application No. PCT/US11/63587, filed Dec. 6, 2011, entitled ENHANCED SLOT-MACHINE FOR CASINO APPLICATIONS and published as US Patent Application Publication No. 2013/0296021 A1, each disclosure of which is hereby incorporated by reference in its entirety.

In many embodiments, a pre-authorized transaction interleaved wagering system integrates an interactive entertainment game with a gambling game. In several embodiments, a pre-authorized transaction interleaved wagering system can utilize a GW.con to monitor gameplay of the interactive entertainment game executed by an Eg for a trigger of a gambling event. The trigger for gambling event can be detected from the skillful execution of the interactive entertainment game in accordance with at least one gambling event occurrence rule. The trigger of the gambling event can be communicated to a RC.con. In response to notification of the trigger, the RC.con triggers a gambling event and a RC wager on the outcome of the gambling event that is made in accordance with a wager trigger rule within the gambling game executed by the RC.con. The wager can produce a wager payout as a randomly generated payout of both RC and gameplay resources. In addition, gameplay of an interactive entertainment game in a pre-authorized transaction interleaved wagering system can be modified by the GW.con upon the wager payout. In various embodiments, interactive entertainment game gameplay can advance through the performance of pre-authorized transaction interleaved wagering system player actions. For purposes of this discussion, a game player action is an action during pre-authorized transaction interleaved wagering system gameplay that can be performed by a player or to a player.

In several embodiments, a gambling event occurrence can be determined from one or more game world variables within an interactive entertainment game that are used to trigger a gambling event and/or associated wager in a gambling game. Game world variables can include, but are not limited to, passage of a period of time during pre-authorized transaction interleaved wagering system entertainment game gameplay; a result from a pre-authorized transaction interleaved wagering system entertainment game gameplay session (such as, but not limited to, achieving a goal or a particular score); a player action that is a consumption of an element; or a player action that achieves a combination of elements to be associated with a player profile.

In numerous embodiments, an interactive entertainment game modification is an instruction of how to modify interactive entertainment game gameplay resources based upon one or more of a gambling game payout and game world variables. An interactive entertainment game modification can modify any aspect of an interactive entertainment game, such as, but is not limited to, an addition of a period of time available for a current gameplay session for the interactive entertainment game of pre-authorized transaction interleaved wagering system, an addition of a period of time available for a future pre-authorized transaction interleaved wagering system entertainment game gameplay session or any other modification to the interactive entertainment game elements that can be utilized during entertainment game gameplay. In some embodiments, an interactive entertainment game modification can modify a type of element whose consumption triggers a gambling event occurrence. In many embodiments, an interactive entertainment game modification can modify a type of element whose consumption is not required in a gambling event occurrence.

In a number of embodiments, a player interface can be utilized that depicts a status of the pre-authorized transaction interleaved wagering system entertainment game. A player interface can depict any aspect of a pre-authorized transaction interleaved wagering system entertainment game including, but not limited to, an illustration of pre-authorized transaction interleaved wagering system entertainment game gameplay advancement as a player plays the pre-authorized transaction interleaved wagering system.

Pre-Authorized Transaction Interleaved Wagering Systems

In many embodiments, a pre-authorized transaction interleaved wagering system provides a skill wagering interleaved game that integrates high-levels of entertainment content from an interactive entertainment game (game of skill) and a gambling experience from a game of chance (gambling game). A pre-authorized transaction interleaved wagering system provides for random gambling game outcomes that are independent of player skill while providing a gaming experience (as measured by obstacles/challenges encountered, time of play and other factors) shaped by the player's skill. A pre-authorized transaction interleaved wagering system in accordance with an embodiment of the invention is illustrated in FIG. 1. The pre-authorized transaction interleaved wagering system 128 includes a RC.con 102, a GW.con 112, and an Eg 120. The RC.con 102 is operatively connected to, and communicates with, the GW.con 112. The Eg 120 is also operatively connected to, and communicates with, the GW.con 112.

In several embodiments, the RC.con 102 is an controller for one or more gambling games provided by the pre-authorized transaction interleaved wagering system 128 and controls and operates the gambling games. The one or more gambling games consume wagers in the form of RC. A gambling game can increase or decrease an amount of RC based on random gambling game outcomes, where the gambling proposition of a gambling game is typically regulated by gaming control bodies. In many embodiments, the RC.con 120 includes a, pseudo random or random number generator (P/RNG) 106; one or more real-world credit pay tables 108; RC meters 110; and other software constructs that enable a game of chance to offer a fair and transparent gambling proposition, and the auditable systems and functions that can enable the game to obtain gaming regulatory body approval.

P/RNG 106 includes software and/or hardware performing processes that can generate random or pseudo random outcomes. The one or more pay tables 108 are tables that can be used in conjunction with P/RNG 106 to determine an amount of RC earned as a function of pre-authorized transaction interleaved wagering system gameplay. Examples of a pay table include, but are not limited to pay tables used in a conventional slot machine. There can be one or more pay tables 108 in the RC.con 102. The pay tables 108 are used to implement one or more gambling propositions for the one or more gambling games. In some embodiments, selection of the pay table 108 to use to resolve a gambling event and/or wager can be based on factors including, but not limited to, game progress a player has earned through skillful play of the interactive entertainment game; and eligibility of the player for bonus rounds. RCs can be decremented and/or augmented based on the outcome of the P/RNG 106 according to a pay table 108 independent of player skill. In certain embodiments, an amount of RC can be used as criteria in order to enter higher levels of the interactive entertainment game provided by the pre-authorized transaction interleaved wagering system interleaved game. In accordance with some embodiments, RC can be carried forward to higher game levels or paid out if a cash out is opted for by a player. The amount of RC used to enter a specific level of the game level n need not be the same for each level.

In many embodiments, the RC.con 102 includes a pre-authorized transaction interleaved wagering system module 164 that implements one or more features of a pre-authorized transaction interleaved wagering system as described herein.

In many embodiments, the GW.con 112 manages the overall pre-authorized transaction interleaved wagering system operation, with the RC.con 102 and the Eg 120 being support units to the GW.con 112. In several embodiments, the GW.con 112 may include mechanical, electronic and/or software systems for a pre-authorized transaction interleaved wagering system entertainment game. The GW.con 112 is an interface between an interactive entertainment game provided by Eg 120 and the gambling game provided by RC.con 102. The GW.con 112 includes a game world decision engine 122 that receives game world information 124 communicated from the Eg 120. The game world decision engine 122 uses the game world information 124, along with trigger logic 126 to generate gambling and/or wagering information 129 about triggering a gambling event and/or an associated wager of RC in the RC.con 102. In some embodiments, the game world information 124 includes, but is not limited to, game world variables from the Eg that indicate the state of the Eg and the interactive entertainment game that is being played by a player 140; and player actions and interactions 142 between the player and entertainment game provided by the Eg 120. The gambling and/or wager information 128 may include, but is not limited to, an amount of RC to be wagered, a trigger of a gambling game, and a selection of a pay table 108 to be used by the gambling game.

In some embodiments, the game world decision engine 122 also receives gambling game outcome information 130 communicated from the RC.con 102. The decision engine 122 uses the gambling game outcome information 130, in conjunction with the game world information 124 and game world logic 132 to generate game world update information 134 about what kind of game world resources 136 are to be provided to the Eg 120. A game world resource generator 138 generates the game world resources 136 based on the game world update information 134 provided by the game world decision engine 122 and communicates the generated resources to the Eg 120.

In various embodiments, the game world decision engine 122 also calculates the amount of GWC to award to the player 140 based at least in part on the player's skillful execution of the interactive entertainment game of the pre-authorized transaction interleaved wagering system as determined from the game world information 124. In some embodiments, gambling game outcome information 130 may also be used to determine the amount of GWC should be awarded to the player.

In some embodiments, the game world update information 134 and gambling game outcome information 130 are provided to a player interface generator 144. The player interface generator 144 receives the game world update information 134 communicated from the game world decision engine 122 and gambling game outcome information 130 communicated from the RC.con 102, and generates pre-authorized transaction interleaved wagering system information 146 describing the state of the pre-authorized transaction interleaved wagering system. In some embodiments, the pre-authorized transaction interleaved wagering system information 146 may include, but is not limited to, amounts of GWC amounts earned, lost or accumulated by the player through skillful execution of the interactive entertainment game, and RC amounts won, lost or accumulated as determined from the gambling game outcome information 130 and the RC meters 110. The player interface generator 144 communicates the skill wagering interleaved game information 146 to a skill wagering interleaved game player interface 148 of the Eg 120.

The GW.con 112 can further couple to the RC.con 102 to determine the amount of RC available in the game and other wagering metrics of the gambling game. Thus, the GW.con 112 may potentially affect the amount of RC in play for participation in the gambling events of a gambling game provided by the RC.con 102 in some embodiments. The GW.con 112 may additionally include various audit logs and activity meters. In some embodiments, the GW.con 112 can also couple to a centralized server for exchanging various data related to the player and the activities of the player during game play of a pre-authorized transaction interleaved wagering system.

In some embodiments, the GW.con 112 operatively connects to the Eg 120 to manage the interactive entertainment game provided. In several embodiments, game world credits (GWC) are player points earned or depleted as a function of player skill as a function of player performance in the context of the game. GWC may be analogous to the score in a typical video game. A pre-authorized transaction interleaved wagering system entertainment game can have one or more scoring criteria, embedded within the GW.con 112 and/or the Eg 120 that reflect player performance against goal(s) of an interactive entertainment game. In some embodiments, GWC can be carried forward from one level of sponsored gameplay of the entertainment to another level. In many embodiments, GWC can be used within the Eg to purchase in-game items, including but not limited to, elements that have particular properties, power ups for existing items, and other item enhancements. In many embodiments, GWC may be used to earn entrance into a sweepstakes drawing; to earn entrance in a tournament with prizes; to score in the tournament; and/or to participate and/or score in any other game event. In many embodiments, GWC can be stored on a player tracking card or in a network-based player tracking system where the GWC is attributed to a specific player.

In some embodiments, the operation of the GW.con 112 does not affect the provision of the gambling game by the RC.con 102 except for player choice parameters that are allowable in a gambling game. Examples of player choice parameters include, but not limited to, wager terms such as but not limited to a wager amount; speed of game play (for example, by pressing a button or pulling a handle of a slot machine); and/or agreement to wager into a bonus round. In accordance with these embodiments, the RC.con 102 provides a fair and transparent, non-skill based gambling proposition co-processor to the GW.con 112. In the illustrated embodiment, the communication of gambling game outcome information 128 shown between the GW.con 112 and the RC.con 102 allows the GW.con 112 to obtain information from the RC.con 102 as to the amount of RC available in the gambling game. In various embodiments, the communication link can also be used to convey a status operation of the RC.con 102. In a number of embodiments, the communication link used to communicate the gambling and/or wagering information 128 between the RC.con 102 and the GW.con 112 can further be used to communicate the various gambling control factors which the RC.con 102 uses as input. Examples of gambling control factors include, but are not limited to, the number of RC consumed per gambling event; and/or the player's election to enter a jackpot round. In FIG. 1, the GW.con 112 is also shown as connecting to the player's player interface 148 directly, as the GW.con 112 can utilize the player interface 148 to communicate certain interactive entertainment game information including but not limited to, club points; player status; control of the selection of choices; and messages which a player can find useful in order to adjust the interactive entertainment game experience or understand the gambling status of the player in the gambling game in the RC.con 102.

In many embodiments, the GW.con includes a pre-authorized transaction interleaved wagering system module 162 that implements one or more features of a pre-authorized transaction interleaved wagering system as described herein.

In various embodiments, the Eg 120 manages and controls the visual, audio, and player control for the interactive entertainment game. In certain embodiments, the Eg 120 accepts input from a player through a set of hand controls, and/or head, gesture, and/or eye tracking systems and outputs video, audio and/or other sensory output to a player interface. In many embodiments, the Eg 120 can communicate data with, and accept control information from, the GW.con 112. In several embodiments, the Eg 120 can be implemented using a processing device executing a specific entertainment game software program. Examples of processing devices that may host the Eg 120 include, but are not limited to, electronic gaming machines, personal computers such as tablet computers, desk top computers and laptop computers, gaming consoles, smartphones, and personal digital assistants. In numerous embodiments, the Eg 120 can be an electromechanical game system that provides an electromechanical skill interleaved wagering game. An electromechanical skill interleaved wagering game executes an electromechanical entertainment game for player entertainment. The electromechanical entertainment game can be any game that utilizes both mechanical and electrical components, where the game operates as a combination of mechanical motions performed by at least one player or the electromechanical game itself. Various electromechanical skill wagering interleaved games are discussed in Patent Cooperation Treaty Application No. PCT/US12/58156, filed Sep. 29, 2012, now U.S. Pat. No. 8,790,170, issued Jul. 29, 2014, U.S. Pat. No. 8,944,899, issued Feb. 3, 2015, and US Patent Application Publication No. 2015/0141128 A1, the contents of which are hereby incorporated by reference in their entirety.

In the shown embodiment, the Eg 120 operates mostly independently from the GW.con 112. Via the communication of game world resources 136, however, the GW.con 112 can send certain interactive entertainment game resources including control parameters to the Eg 120 to affect the Eg's execution, such as (but not limited to) changing the difficulty level of the game. In various embodiments, these interactive entertainment game control parameters can be based on a wager outcome of a gambling game that was triggered by an element in the interactive entertainment game being acted upon by the player. The Eg 120 can accept this input from the GW.con 112, make adjustments, and continue interactive entertainment game gameplay all the while running seamlessly from the player's perspective.

The execution of the interactive entertainment game by the Eg 120 is mostly skill based, except for where the processes performed by the Eg 120 can inject complexities into the game by chance in the normal operation of gameplay to create unpredictability in the interactive entertainment game. The Eg 120 can also communicate player choices made in the game to the GW.con 112, included in the game world information 124, such as but not limited to the player's utilization of the elements of the interactive entertainment game during the player's skillful execution of the interactive entertainment game. In this architecture, the GW.con is interfaced to the Eg 120 in order to allow the transparent coupling of an interactive entertainment game to a fair and transparent random chance gambling game, providing a seamless perspective to the player that they are playing a typical popular interactive entertainment game (which is skill based).

In many embodiments, the Eg includes a pre-authorized transaction interleaved wagering system module 160 that implements one or more features of a pre-authorized transaction interleaved wagering system as described herein.

In several embodiments, the RC.con 102 can accept a trigger to resolve a gambling event in a gambling game in response to actions taken by the player in the interactive entertainment game as conveyed by the Eg 120 to the GW.con 112. The GW.con 112 triggers the gambling event in the gambling game using trigger logic 126, and the RC.con 102 resolves the gambling event in the background of the overall pre-authorized transaction interleaved wagering system from the player's perspective and provide information about the outcome of the gambling event to the GW.con 112 to expose the player to certain aspects of the gambling game. Examples of aspects of the gambling game that may be exposed to the player include, but are not limited to, odds of certain outcomes, amount of RC in play, and amount of RC available. In a number of embodiments, the RC.con 102 can accept modifications in the amount of RC wagered on each individual gambling event, in the number of gambling events per minute the RC.con 102 can resolve entrance into a bonus round, and other factors. One skilled in the art will note that these factors can take a different form than that of a typical slot machine. An example of a varying wager amount that the player can choose can include, but is not limited to, gameplay using a more difficult interactive entertainment game level. These factors can increase or decrease the amount wagered per individual gambling game in the same manner that a standard slot machine player can decide to wager more or less credits for each pull of the handle. In several embodiments, the RC.con 102 can communicate a number of factors back and forth to the GW.con 112, via an interface, such that an increase/decrease in a wagered amount can be related to the change in player profile of the player in the interactive entertainment game. In this manner, a player can control a wager amount per gambling event in the gambling game with the change mapping to a parameter or component that is applicable to the interactive entertainment game experience.

In many embodiments, a pre-authorized transaction interleaved wagering system integrates a video game style gambling game provided by a gambling machine where the gambling game (including an RC.con 102 and RC) may not be player skill based. In some embodiments, the gambling game may allow players to use their skills to earn club points which a gaming establishment operator can translate into rewards including, but not limited to, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established within the interactive entertainment game. In several embodiments, the pre-authorized transaction interleaved wagering system can leverage entertainment game titles popular with gamers and provide a sea change in a gaming establishment environment to attract players with games that are more akin to the type of entertainment that a younger generation desires. In various embodiments, players can use their skill in the interactive entertainment game towards building and banking GWC. The GWC may then by be used to win tournaments and various prizes as a function of skills of the gamer. In a number of embodiments, the pre-authorized transaction interleaved wagering system minimizes the underlying changes applied to the aforementioned entertainment software for the skill interleaved wagering game to operate within an interactive entertainment game construct. Therefore, a plethora of complex game titles and environments can be rapidly and may be inexpensively deployed in a gambling environment.

In certain embodiments, pre-authorized transaction interleaved wagering systems also allow players to gain entry into subsequent competitions through the accumulation of game world credits (GWC) as a function of the user's demonstrated skill at the game. These competitions can pit individual players or groups of players against one another and/or against the operator of a gambling game (such as but not limited to a gaming establishment) to win prizes based upon a combination of chance and skill. These competitions can be asynchronous events whereby players participate at a time and/or place of their choosing or synchronized events whereby players participate at a specific time and/or venue.

In many embodiments, one or more players can be engaged in playing a skill based interactive entertainment game executed by the Eg 120. In various embodiments, a pre-authorized transaction interleaved wagering system can include an interactive entertainment game that includes head to head play between a single player and the computer; between two or more players against one another; or multiple players playing against the computer and/or each other as well as a process by which a player can bet on the outcome of an interactive entertainment game. In some embodiments, the interactive entertainment game can be a game where the player is not playing against the computer or any other player such as games where the player is effectively playing against himself or herself.

In some embodiments, a player authorization system 150 is used to authorize gaming session. The GW.con 112 communicates to the player authorization system 150 game session information 152 that may include, but is not limited to, player, Eg, GW.con and RC.con information. The player authorization system receives the game session information 152 and uses the player, Eg, GW.con and RC.con information to regulate a gaming session. In some embodiments, the player authorization system may also assert control of a game session 154. Such control may include, but is not limited to, ending a game session, initiating gambling in a game session, ending gambling in a game session but not ending a player's play of the entertainment game portion of the game, and changing from real credit wagering to virtual credit wagering, or vice versa.

Figure 2:
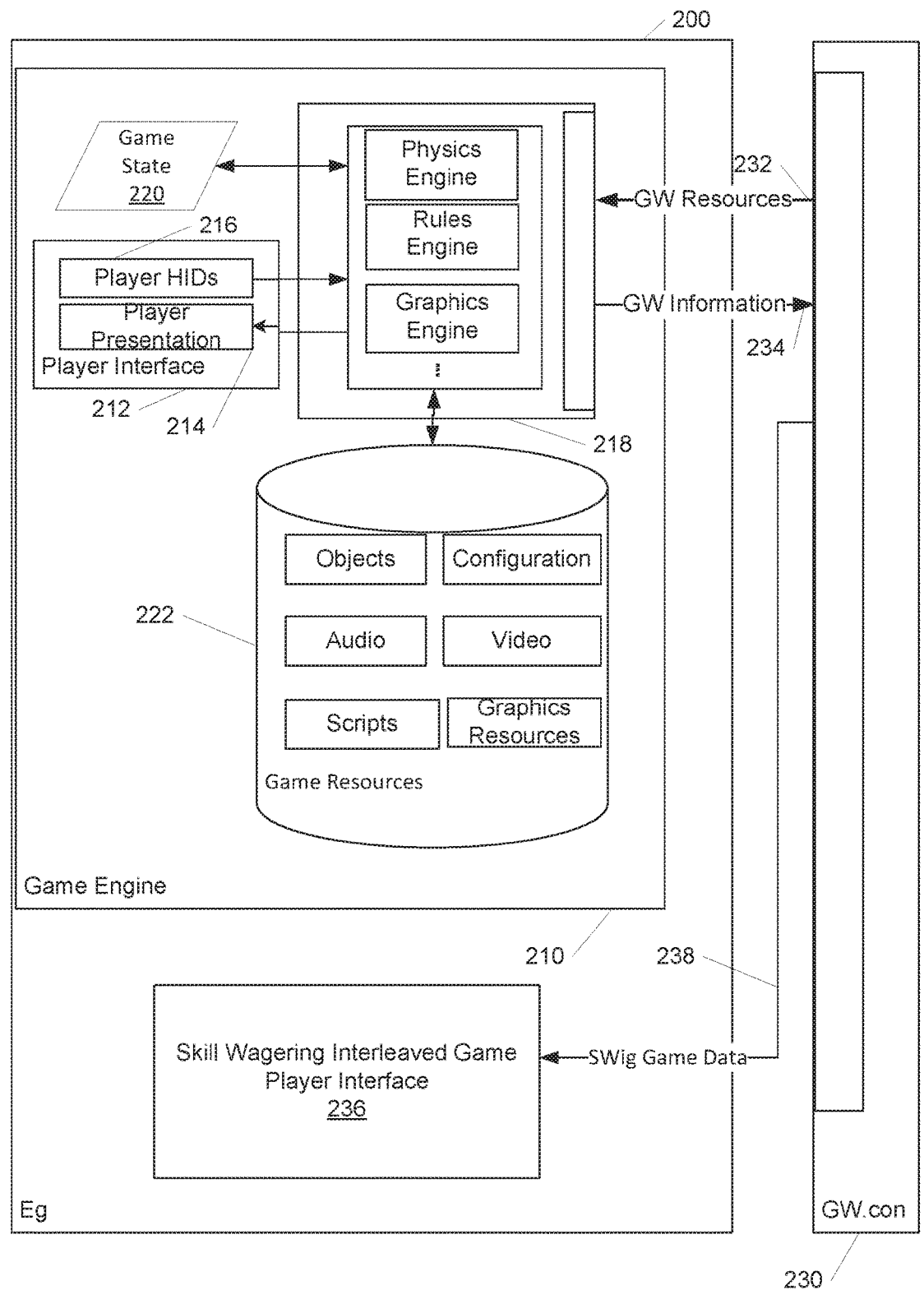
FIG. 2 illustrates a block diagram of components of an interactive entertainment game in accordance with an embodiment of the invention.

The components of an Eg in accordance with an embodiment of the invention are shown in FIG. 2. The Eg 200 may be part of the interactive entertainment game system itself, may be a software module that is executed by the interactive entertainment game system, or may provide an execution environment for the interactive entertainment game on a particular host entertainment game system. The Eg 200 and an associated interactive entertainment game are hosted by a processing. Embodiments of processing devices include, but are not limited to, electronic gaming machines, video game consoles, smart phones, personal computers, tablet computers, or the like. In several embodiments, an Eg 200 of a pre-authorized transaction interleaved wagering system includes a game engine 210 that generates a player interface 212 for interaction with a player. The player interface includes a player presentation 214 that is presented to a player through the player interface. The player presentation may include audio features, visual features or tactile feature, or any combination of these preceding features. The player interface 212 further includes one or more human input devices (HIDs) 216 that the player can use to interact with the pre-authorized transaction interleaved wagering system. Various components or sub-engines 218 of the game engine can read data from a game state 220 in order to implement the features of the Eg. In some embodiments, components or sub-engines 218 of the game engine 210 can include, but are not limited to, a physics engine 250, a rules engine 251, and/or a graphics engine 252. The physics engine 250 is used to simulate physical interactions between virtual objects in the game state. The rules engine 251 implements the rules of the interactive entertainment game and an RNG that may be used for influencing or determining certain variables and/or outcomes to provide a randomizing influence on game play. The graphics engine 252 is used to generate a visual representation of the game state to the player. Furthermore, the sub-engines 218 may also include an audio engine (Not Shown) to generate audio outputs for the player interface 214.

During operation, the game engine 210 reads and writes game resources 222 stored on a data store of the Eg host. The game resources 222 may include game objects 261 having graphics and/or control logic used to implement game world objects of the interactive entertainment game. In various embodiments, the game resources may also include, but are not limited to, video files 264 that are used to generate cut-scenes for the interactive entertainment game; audio files 263 used to generate music, sound effects, etc. within the interactive entertainment game; configuration files 262 used to configure the features of the interactive entertainment game; scripts or other types of control code 265 used to implement various game play features of the interactive entertainment game; and graphics resources 266 such as textures, objects, etc. that are used by the game engine to render objects displayed in an interactive entertainment game.

In operation, components of the game engine 210 read portions of the game state 220 and generate the player presentation 214 for the player which is presented to the player using the player interface 212. The player perceives the presentation and provides player inputs using the HIDs 216. The corresponding player inputs are received as player actions or inputs communicated by various components of the game engine 210. The game engine 210 translates the player actions into interactions with the virtual objects of the game world stored in the game state 220. Components of the game engine use the player interactions with the virtual objects of the interactive entertainment game and the interactive entertainment game state 220 to update the game state 220 and update the presentation 214 presented to the user. The process loops in a game loop continuously while the player plays the pre-authorized transaction interleaved wagering system.

The Eg 200 provides one or more interfaces between an Eg 200 and other components of a pre-authorized transaction interleaved wagering system, such as a GW.con 230. The Eg 200 and the other pre-authorized transaction interleaved wagering system components communicate with each other using the interfaces. The interface may be used to pass various types of data, and to send and receive messages, status information, commands and the like. In certain embodiments, the Eg 200 and GW.con 230 communicate game world resources 232 and game world information 234. In some embodiments, the communications include requests by the GW.con 230 that the Eg 200 update the game state 220 using information provided by the GW.con 230. In many embodiments, a communication by the GW.con 230 requests that the Eg 200 update one or more game resources 222 using information provided by the GW.con 230. In a number of embodiments, the Eg 200 provides all or a portion of the game state to GW.con 230. Is some embodiments, the Eg 200 may also provide information about one or more of the game resources 222 to the GW.con 230. In some embodiments, the communication includes player actions that the Eg 200 communicates to the GW.con 230. The player actions may be low level player interactions with the player interface 212, such as manipulation of an HID, or may be high level interactions with game objects as determined by the interactive entertainment game. The player actions may also include resultant actions such as modifications to the pre-authorized transaction interleaved wagering system state 220 or game resources 222 resulting from the player's actions taken in the pre-authorized transaction interleaved wagering system entertainment game. In some embodiments, player actions include, but are not limited to, actions taken by entities such as non-payer characters (NPC) of the interactive entertainment game that act on behalf of or under the control of the player.

In some embodiments, the Eg 200 includes a pre-authorized transaction interleaved wagering system player interface 236 used to communicate pre-authorized transaction interleaved wagering system data 238 to and from the player. The communications from pre-authorized transaction interleaved wagering system interface 236 include, but are not limited to, information used by the player to configure gambling game RC wagers, and information about the gambling game RC wagers such as, but not limited to, RC balances and RC amounts wagered.

Figure 3A:
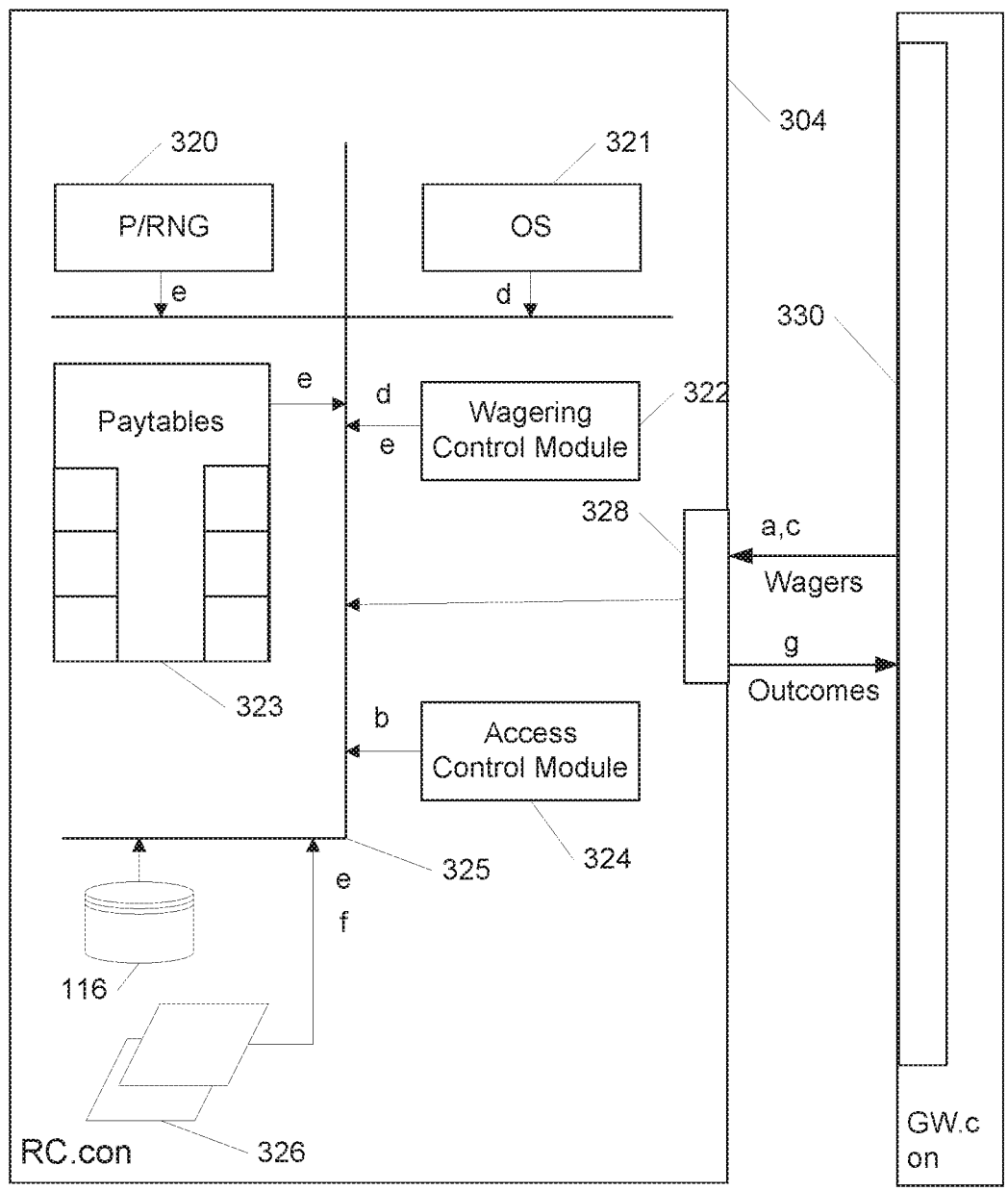
FIG. 3A illustrates a real credit controller in accordance with embodiments of the invention.

Components of an RC.con in accordance with an embodiment of the invention are shown in FIG. 3. The RC.con 304 has an controller OS 321 which controls the functions of the RC.con 304; a random number generator (RNG) 320 to produce random numbers or pseudo random numbers; one or more pay tables 323 which includes a plurality of factors indexed by the random number to be multiplied with an amount of RC committed in a wager; and a wagering control module 322 whose processes may include, but are not limited to, pulling random numbers, looking up factors in the pay tables, multiplying the factors by an amount of RC wagered, and administering one or more RC credit meters 326. The RC.con 304 may also include storage for statuses, wagers, wager outcomes, meters and other historical events in a storage device 316. An authorization access module 324 provides a process to permit access and command communication with the RC.con 304 and access to a repository (a credit meter) 326 for the amount of RC which player has deposited in the pre-authorized transaction interleaved wagering system. An external interface 328 allows the RC.con 304 to interface to another system or device, such as a GW.con 330. The various RC.con modules and components can interface with each other via an internal bus 325 and/or other appropriate communication mechanism.

In various embodiments, an RC.con 304 may use an RNG provided by an external system. The external system may be operatively connected to the RC.con 304 by a local area network (LAN) or a wide area network (WAN) such as the Internet. In some embodiments, the external RNG is a central deterministic system such as a regulated and controlled random numbered ball selection device or some other system that provides random or pseudo random numbers to one or more operatively connected RC.cons. In numerous embodiments, the interface between the RC.con 304 and other systems/devices including an external RNG may be the Internet. However, other methods of communication may be used including, but not limited to, a LAN, a USB interface, and/or some other method by which two electronic devices could communicate with each other.

In numerous embodiments, signaling occurs between various components of an RC.con 304 and an external system, such as GW.con 330. In some of these embodiments, the purpose of the RC.con 304 is to manage wagering on gambling events and to provide random (or pseudo random) numbers from an RNG. The external system requesting wagering support instructs the RC.con 304 as to the pay table 328 to use and/or the amount of RC to wager. Next, the external system signals the RC.con 304 to trigger a gambling event with an associated wager on the results of the gambling event wager. The RC.con 304 resolves the gambling event and determines the outcomes of the wager. The RC.con can then inform the external system as to the outcome of the wager (the amount of RC won,) and/or the amount of RC in the player's account in the credit repository.

In various embodiments, a second communication exchange between the RC.con 304 and an external system relates to the external system using an RNG result support from the RC.con 304. In this exchange, the external system requests an RNG result from the RC.con 304. In response, the RC.con 304 returns an RNG result as a function of an internal RNG or an RNG external to the RC.con 304 to which the RC.con 304 is operatively connected.

In some embodiments, a communication exchange between the RC.con 304 and an external system relate to the external system support for coupling an RNG result to a particular pay table contained in the RC.con 304. In such an exchange, the external system instructs the RC.con 304 as to the pay table 323 to use, and requests a result whereby the RNG result would be operatively connected to the requested pay table 323. The result of the coupling is returned to the external system. In such an exchange, no actual RC wager is conducted, but might be useful in coupling certain non-RC wagering interactive entertainment game behaviors and propositions to the same final resultant wagering return which is understood for the pre-authorized transaction interleaved wagering system to conduct wagering. In a number of embodiments, some or all of the various commands and responses discussed above can be combined into one or more communication packets.

The RC.con 304 operates in the following manner in accordance with some embodiments of the invention. The process begins by a RC.con 304 receiving signals from an external system requesting a connection to RC.con 304 (352). The request includes credentials for the external system. The Access Authorization Module 324 determines that the external system is authorized to connect to RC.con 304 (354) and communicates an authorization response to the external system (355). The external systems provide a request for a gambling event to be performed to the RC.con 304 (356). The request may include an indication of a wager amount on a proposition in the gambling event, and a proper pay table 323 to use to resolve the wager. The external system then sends a signal to trigger the gambling event (358).

The OS 321 instructs the Wager Control Module 322 as to the amount of the RC wager and the Pay Table 323 to select as well as to resolve the wager (360). In response to the request to execute the gambling event, the wager control module 222 requests an P/RNG result from the P/RNG 320 (362); retrieves a proper pay table or tables from the pay tables 323 (364); adjusts the RC of the player in the RC repository 326 as instructed (366); applies the P/RNG result to the particular pay table or tables 323 (368); and multiplies the resultant factor from the Pay Table by the amount of RC wagered to determine the result of the wager (368). Wager Control Module 322 then adds the amount of RC won by the wager to the RC repository 326 (370); and provides the outcome of the wager, and the amount of RC in the repository and the RC won to the external system (372). It should be understood that there may be many different embodiments of an RC.con 304 including embodiments where many modules and components of the RC.con 304 are located in various servers and locations, so the foregoing is not meant to be exhaustive or all inclusive, but rather provide information on various embodiments of an RC.con 304.

Figure 3B:
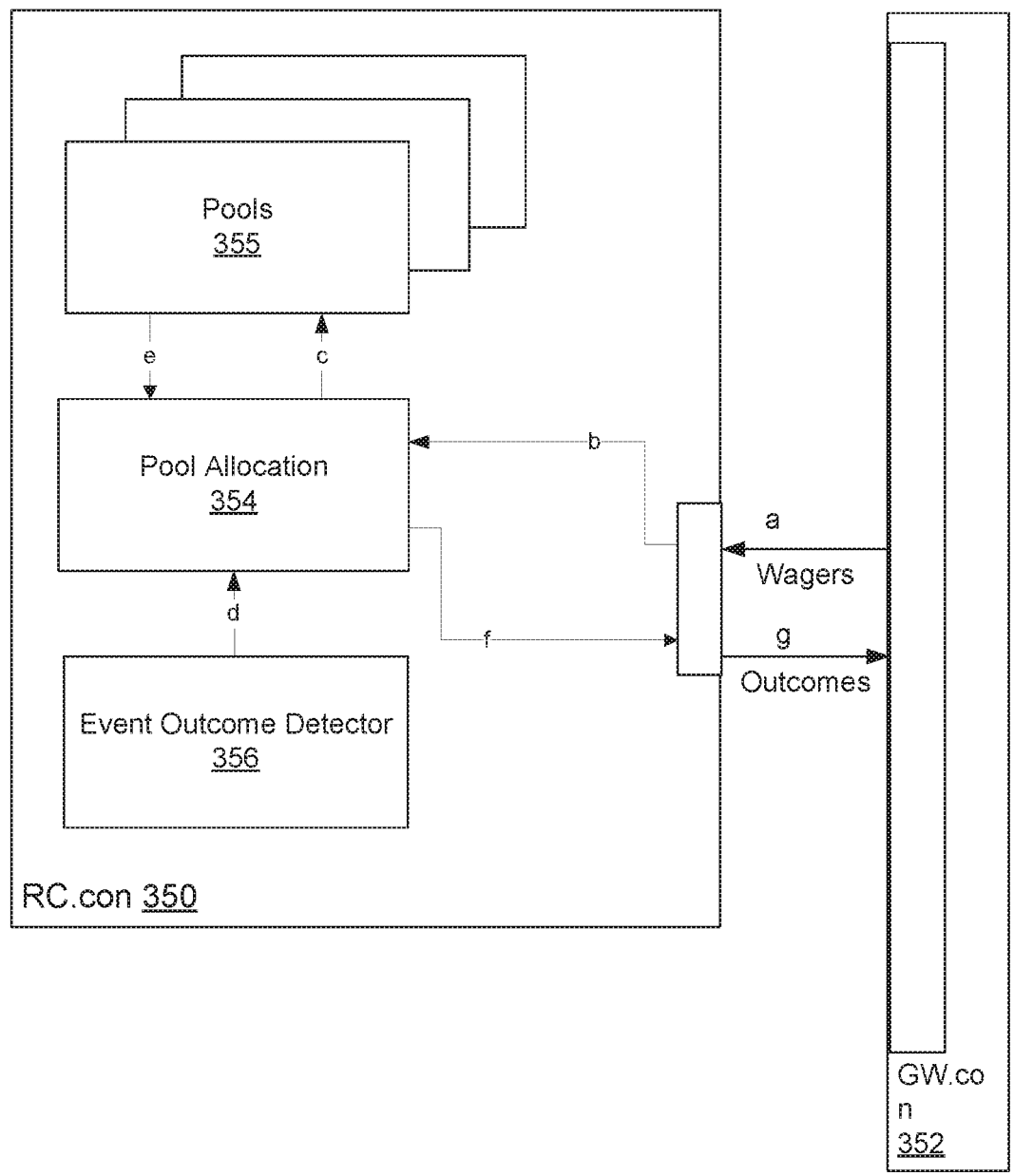
FIG. 3B is an illustration of a pari-mutuel based real credit controller in accordance with embodiments of the invention.

FIG. 3B is an illustration of an RC.con in accordance with an embodiment of the invention. In this embodiment, the RC.con 350 is a pari-mutuel wagering system such as used for wagering on horse races, greyhound races, sporting events and the like. In a pari-mutuel wagering system, player's wagers on the outcome of an event, such as a horse race or the like, are allocated to a pool. When the event occurs, wager outcomes are calculated by sharing the pool among all winning wagers.

In numerous embodiments, signaling occurs between various types of an RC.con and an external system, such as GW.con 352. In some of these embodiments, the purpose of the RC.con is to allocate (354) wagers to pools 355, detect occurrences (356) of one or more events upon which the wagers were made, and determine the wager outcomes for each individual wager based on the number of winning wagers and the amount paid into the pool. In some embodiments, the RC.con manages accounts for individual players wherein the players make real world credit deposits into the accounts, amounts of real world credit wagers are deducted from the accounts, and real world credits are credited to the players' accounts based on the wager outcomes.

In numerous embodiments, some or all of the various commands and responses illustrated herein could be combined into one or more communication packets.

The following table illustrates a process for operation of the RC.con 350 in accordance with various embodiments:

| | |
|---|---|
| a | An external system, such as GW.con 352, signals the RC.con that the external system wishes the RC.con to accept a wager and communicates wager information including, but not limited to, an identifier of a player, a type of wager to be made and an amount of RC to wager. |
| b and c | The RC.con receives the wagering information and allocates the amount of RC of the wager to an appropriate pool with the RC amounts of one or more other wagers for the same type of wager. |
| d | The RC.con detects when the occurrence of one or more events upon which the wagers were made. |
| e, f and g | The RC.con determines wager outcomes for each wager in the pool by determining which wagers were winning wagers and which wagers were losing wagers. The RC.con allocates the pooled RC amounts to the winning wagers and then communicates the wager outcomes to the external system. |

It should be understood that there may be many embodiments of an RC.con 350 which could be possible, including forms where many modules and components of the RC.con are located in various servers and locations, so the foregoing is not meant to be exhaustive or all inclusive, but rather provide information on various embodiments of an RC.con 350.

Figure 4:
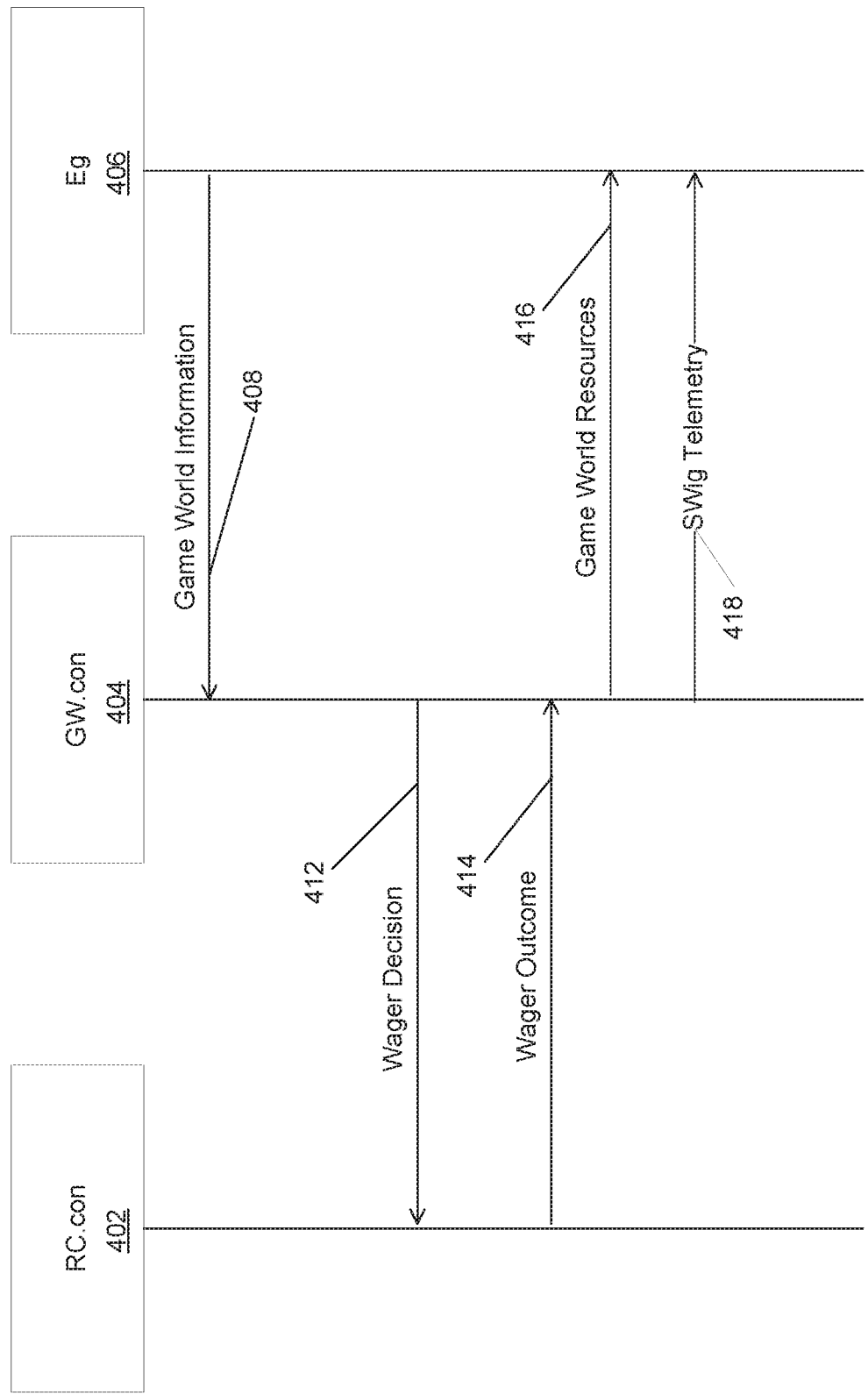
FIG. 4 illustrates a timing diagram of interactions between components of a pre-authorized transaction interleaved wagering system entertainment game in accordance with an embodiment of the invention.

A timing diagram of a process that facilitates interactions between components of a pre-authorized transaction interleaved wagering system providing an interactive entertainment game and a gambling game in accordance with an embodiment of the invention is shown in FIG. 4. The components of the pre-authorized transaction interleaved wagering system process include RC.con 402, GW.con 404, and Eg 406. The process begins with Eg 406 detecting a player performing a player action in the interactive entertainment game using a player interface. The Eg 406 provides a GW.con 404 with game world data (408). In some embodiments, the game world data includes but is not limited to, the player interaction detected by the Eg 406. In some embodiments, the GW.con 404 can provide the Eg 406 with information as to the amount of EE that will be consumed by the player action in response to receiving the game world data (410). The GW.con 404 may also provide information to configure a function that controls EE consumption, decay or addition to the Eg 406 in response to receiving the game world data. The Eg 406 can, based upon the function, consume an amount of EE designated by the GW.con 404 to couple to the player action. Upon detection that the player action is a gameplay gambling event, the GW.con 404 can send a request to provide a gambling event to an RC.con 402 (412). The request for a gambling event may include the wager terms associated with the gameplay gambling event in some embodiments. The RC.con 402 can consume RC in executing the gambling event and resolving the wager. The RC.con 402 can return RC as a payout from the wager. The RC.con 402 can inform (414) the GW.con 404 as to the outcome of the gambling event and/or any associated wagers. Based on the outcome of the gambling event, the GW.con 404 can determine game world resources in the interactive entertainment game to award to the player. The GW.con may provide information about the game world resources award to the Eg 406 (416). In some embodiments, the game world resources may be a payout of EE based upon the outcome of the gambling event and/or a wager associated with the gambling event. The Eg 406 can reconcile and combine the payout of EE with the EE already ascribed to the player in the sports event driven skill entertainment game. In various embodiments, the Eg 406 can provide an update to the GW.con 404 as to the updated status of the interactive entertainment game based upon reconciling the payout of EE. The GW.con 404 may then determine an amount of GWC to award in the interactive entertainment game based upon the updated status and provide the GWC amount to the Eg 406 in response to the status update in some embodiments.

The following is an example of the sequence of events in the timing diagram of FIG. 4 in a pre-authorized transaction interleaved wagering system provides a Sudoku game as the interactive entertainment game in accordance with an embodiment of the invention. In a Sudoku game, a player can take an action, such as selecting a number to be placed in a section of a Sudoku board. The Eg 406 provides information about the player action to the GW.con 404 (408). The information about the player action may include, but is not limited to, the player's choice of a symbol, the position on the Sudoku puzzle board that the symbol is played, and whether or not the symbol as played was a correct symbol in terms of eventually solving the Sudoku puzzle. The GW.con 404 can process the information concerning the placement of the symbol, and determine that the player action consumes a symbol (EE) with each placement. The GW.con 404 provides information about the consumption of the symbol to the Eg 406 (410). The Eg 406 then will consume the EE based upon the placement of the symbol. The GW.con can also determine that a gambling event is triggered by the placement of the symbol and communicate a request (412) to the RC.con 402. The request may indicate that 3 credits of RC are to be wagered on the outcome of the gambling event to match the placement of the symbol (EE) that is consumed and indicate a particular pay table (table Ln-RC) that the RC.con 402 is to use to resolve the wager. The RC.con 402 can consume the 3 credits for the wager, execute gambling event, and resolve the specified wager. In executing the gambling event and resolving the wager, the RC.con 402 can determine that the player hits a jackpot of 6 credits and allocate the 6 credits of RC to the credit meter. In other embodiments, any of a variety of credits, pay tables and/or payouts can be utilized in the resolution of gambling events as appropriate to the requirements of specific applications. The RC.con 402 also provides gambling event outcome information to the GW.con 404 (414) that informs the GW.con 404 that 6 credits of RC net were won as a payout from the wager. Based on the gambling event outcome information, the GW.con 404 can determine that 2 additional symbols are to be made available to the player. The GW.con 404 provides the game world resources information (416) to the Eg 406 informing the Eg 406 to add 2 additional symbols (EE) to the set of symbols available to a player based upon the gambling game payout. The Eg 406 can then add 2 symbols (EE) to the number of symbol placements available to a player in the Sudoku game. The GW.con can receive an update (418) from the Eg 406 as to the total amount of EE associated with the player. The GW.con can log the new player score (GWC) in the game (as a function of the successful placement of the symbol) based on the update, and provide a score update (420) the Eg to add 2 extra points of GWC to the player's score. Although the above discussion describes the performance of the processes shown in FIG. 4 in the context of a Sodoku entertainment game, similar processes can be utilized to provide other types of entertainment games appropriate to the requirements of specific applications in accordance with embodiments of the invention.

In many embodiments, a player can bet on whether or not the player will beat another player. These bets can be made, for example, on the final outcome of an interactive entertainment game, and/or the state of the interactive entertainment game along various intermediary points (such as but not limited to the score at the end of a period of time of an interactive entertainment game session) and/or on various measures associated with the interactive entertainment game. Players can bet against one another, or engage the computer in a head to head competition in the context of the player's skill level in the interactive entertainment game in question. As such, players can have a handicap associated with their player profile that describes their skill in the interactive entertainment game which can be the professed skill of the player in some embodiments. The handicap may be used by a GW.con to offer appropriate bets around the final and/or intermediate outcomes of the interactive entertainment game; to condition sponsored gameplay as a function of player skill; and/or to select players across one or more pre-authorized transaction interleaved wagering systems to participate in head to head games and/or tournaments.

Many embodiments of the pre-authorized transaction interleaved wagering system enable the maximization of the number of players able to compete competitively by handicapping the players based upon skill in the interactive entertainment game and utilizing a skill normalization module to modify the interactive entertainment game based upon the handicaps of players to even the skill level of players competing against each other. Handicapping enables players of varying performance potential to compete competitively regardless of absolute skill level, such as, but not limited to, where a player whose skill level identifies the player as a beginner can compete in head to head or tournament play against a highly skilled player with meaningful results.

In several embodiments, wagers can be made among numerous pre-authorized transaction interleaved wagering systems with a global betting manager (GBM). The GBM is a system that coordinates wagers that are made across multiple pre-authorized transaction interleaved wagering systems by multiple players. In some embodiments, the GBM can also support wagers by third parties relative to the in game performance of other players. The GBM can be a stand-alone system; can be embedded in one of a number of systems including the GW.con, Eg, or any remote server capable of providing services to a pre-authorized transaction interleaved wagering system; or can operate independently on one or a number of servers on-site at a gaming establishment, as part of a larger network and/or the Internet or cloud in general.

Although various components of pre-authorized transaction interleaved wagering systems are discussed above, pre-authorized transaction interleaved wagering systems can be configured with any component as appropriate to the specification of a specific application in accordance with embodiments of the invention. In certain embodiments, components of a pre-authorized transaction interleaved wagering system, such as a GW.con, RC.con, and/or Eg, can be configured in different ways for a specific pre-authorized transaction interleaved wagering system gameplay application. Stand-alone and network connected pre-authorized transaction interleaved wagering systems are discussed below.

Stand-Alone Pre-Authorized Transaction Interleaved Wagering Systems

Figure 5A:
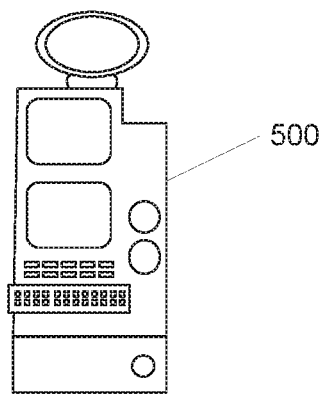
FIGS. 5A, 5B, 5C, and 5D illustrate various devices that host a pre-authorized transaction interleaved wagering system in accordance with embodiments of the invention.
Figure 5B:
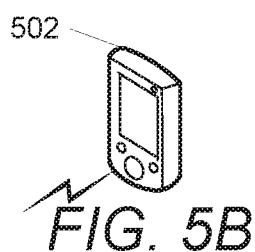
Figure 5C:
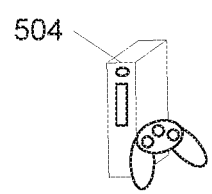
Figure 5D:
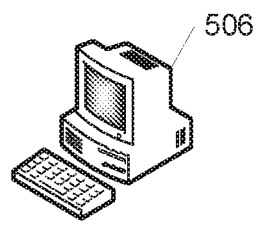

Various types of devices that may be used to host a pre-authorized transaction interleaved wagering system on a stand-alone device in accordance with various embodiments of the invention are shown in FIGS. 5A to 5D. An electronic gaming machine 500 may be used to host a pre-authorized transaction interleaved wagering system. The electronic gaming machine 500, shown in FIG. 5A may be physically located in various types of gaming establishments. A portable device 502 shown in FIG. 5B is a device that may wirelessly connect to a network and may be used to host a pre-authorized transaction interleaved wagering system. Examples of portable devices 502 include, but are not limited to, a tablet computer and/or a smartphone. A gaming console 504, shown in FIG. 5C, may also be used to host a pre-authorized transaction interleaved wagering system. A personal computer 506, shown in FIG. 5D, may also be used to host a pre-authorized transaction interleaved wagering system in accordance with several embodiments of the invention. Indeed, any device including sufficient processing and/or network communication capabilities can be utilized to host a pre-authorized transaction interleaved wagering system as appropriate to the requirements of specific applications in accordance with embodiments of the invention.

Network Connected Pre-Authorized Transaction Interleaved Wagering Systems

Some pre-authorized transaction interleaved wagering systems in accordance with many embodiments of the invention can operate locally while being network connected to draw services from remote locations or to communicate with other pre-authorized transaction interleaved wagering systems. In many embodiments, operations associated with a pre-authorized transaction interleaved wagering system utilizing an interactive entertainment game can be performed across multiple devices. These multiple devices can be implemented using a single server or a plurality of servers such that a pre-authorized transaction interleaved wagering system is executed as a system in a virtualized space such as, but not limited to, where the RC.con and GW.con are large scale centralized servers in the cloud operatively connected to widely distributed Eg controllers or clients via the Internet.

In many embodiments, a RC.con server can perform certain functionalities of a RC.con of a pre-authorized transaction interleaved wagering system. In certain embodiments, a RC.con server includes a centralized odds engine which can generate random outcomes (such as, but not limited to, win/loss outcomes) for gambling events in a gambling game. The RC.con server can perform a number of simultaneous or pseudo-simultaneous runs in order to generate random outcomes for a variety of odds percentages that one or more networked pre-authorized transaction interleaved wagering systems can use. In a number of embodiments, an RC.con of a pre-authorized transaction interleaved wagering system can send information to a RC.con server including, but not limited to, pay tables, maximum speed of play for a gambling game, gambling game monetary denominations, or any promotional RC provided by the operator of the pre-authorized transaction interleaved wagering system. In some specific embodiments, a RC.con server can send information to a RC.con of a pre-authorized transaction interleaved wagering system including, but not limited to, RC used in the gambling game, player profile information, play activity, and/or a profile associated with a player.

In several embodiments, a GW.con server can perform the functionality of the GW.con across various pre-authorized transaction interleaved wagering systems. These functionalities can include, but are not limited to, providing a method for monitoring high scores on select groups of games, coordinating interactions between gameplay layers, linking groups of games in order to join them in head to head tournaments, and acting as a tournament manager.

In a variety of embodiments, management of player profile information can be performed by a patron management server separate from a GW.con server. A patron management server can manage information related to a player profile. The managed information in the player profile may include, but is not limited to, data concerning controlled entities (characters) in interactive entertainment game gameplay; game scores; game elements; RC and GWC associated with a particular players; and tournament reservations. Although a patron management server is discussed separate from a GW.con server, a GW.con server also performs the functions of a patron management server in some embodiments. In a number of embodiments, a GW.con of a pre-authorized transaction interleaved wagering system can send information to a patron management server. The information sent by the GW.con to the patron management system may include, but is not limited to, GWC and RC used in a game; player profile information; play activity; profile information for players; synchronization information between a gambling game and an interactive entertainment game; and/or information about other aspects of a pre-authorized transaction interleaved wagering system. In several embodiments, a patron management server can send patron information to a GW.con of a pre-authorized transaction interleaved wagering system. The patron information may include, but is not limited to, interactive entertainment game title and type; tournament information; table Ln-GWC tables; special offers; character or profile setup and synchronization information between a gambling game and an interactive entertainment game; and information about any other aspect of a pre-authorized transaction interleaved wagering system.

In numerous embodiments, an Eg server provides a host for managing head to head play operating on a network of Egs connected to the Eg server via a network such as the Internet. The Eg server provides an environment where players can compete directly with one another and interact with other players. Although an Eg server is discussed as separate from a GW.con server, the functionalities of an Eg server and GW.con server can be combined in a single server in some embodiments.

Servers connected via a network to implement pre-authorized transaction interleaved wagering systems in accordance with many embodiments of the invention can communicate with each other to provide services utilized by a pre-authorized transaction interleaved wagering system. In several embodiments, a RC.con server can communicate with a GW.con server. In some embodiments, the RC.con server can communicate with a GW.con server to communicate any type of information as appropriate for a specific application. Examples of the information that may be communicated include, but are not limited to, information used to configure the various simultaneous or pseudo simultaneous odds engines executing in parallel within the RC.con to accomplish pre-authorized transaction interleaved wagering system system functionalities; information used to determine metrics of RC.con performance such as random executions run and/or outcomes for tracking system performance; information used to perform audits and/or provide operator reports; and information used to request the results of a random run win/loss result for use in one or more function(s) operating within the GW.con such as, but not limited to, automatic drawings for prizes that are a function of Eg performance.

In several embodiments, a GW.con server can communicate with an Eg server. A GW.con server can communicate with an Eg server to communicate any type of information as appropriate for a specific application. The information that may be communicated between a GW.con server and an Eg server includes, but is not limited to, the information for management of an Eg server by a GW.con server during a pre-authorized transaction interleaved wagering system tournament. Typically, a GW.con (such as a GW.con that runs within a pre-authorized transaction interleaved wagering system or on a GW.con server) is not aware of the relationship of the GW.con to the rest of a tournament since the actual tournament play is managed by the Eg server in a typical configuration. Therefore, management of a pre-authorized transaction interleaved wagering system tournament can include, but is not limited to tasks including, but not limited to, conducting tournaments according to system programming that can be coordinated by an operator of the pre-authorized transaction interleaved wagering system; allowing entry of a particular player into a tournament; communicating the number of players in a tournament; and the status of the tournament (such as, but not limited to the amount of surviving players, the status of each surviving player within the game, and time remaining on the tournament); communicating the performance of players within the tournament; communicating the scores of the various players in the tournament; and providing a synchronizing link to connect the GW.cons in a tournament with their respective Egs.

In several embodiments, a GW.con server can communicate with a patron management server. A GW.con server can communicate with a patron management server to communicate any type of information as appropriate for a specific application. Examples of information communicated between a GW.con server and a patron management system include, but are not limited to, information for configuring tournaments according to system programming conducted by an operator of a pre-authorized transaction interleaved wagering system; information for communication of data used to link a player's player profile to an ability to participate in various forms of pre-authorized transaction interleaved wagering system gameplay (such as but not limited to the difficulty of play set by the GW.con server or the GW.con); information for determining a player's ability to participate in a tournament as a function of a player's characteristics (such as but not limited to a player's gaming prowess or other metrics used for tournament screening); information for configuring GW.con and Eg performance to suit preferences of a player on a particular pre-authorized transaction interleaved wagering system; and information for determining a player's play and gambling performance for the purposes of marketing intelligence; and information for logging secondary drawing awards, tournament prizes, RC and/or GWC into the player profile.

In many embodiments, the actual location of where various process are executed can be located either in the game contained devices (RC.con, GW.con, Eg), on the servers (RC.con server, GW.con server, or Eg server), or a combination of both game contained devices and servers. In a number of embodiments, certain functions of a RC.con server, GW.con server, patron management server and/or Eg server can operate on the local RC.con, GW.con and/or Eg contained with a pre-authorized transaction interleaved wagering system being provided locally on a device. In some embodiments, a server can be part of a server system including multiple servers, where software can be run on one or more physical devices. Similarly, in particular embodiments, multiple servers can be combined on a single physical device.

Figure 6A:
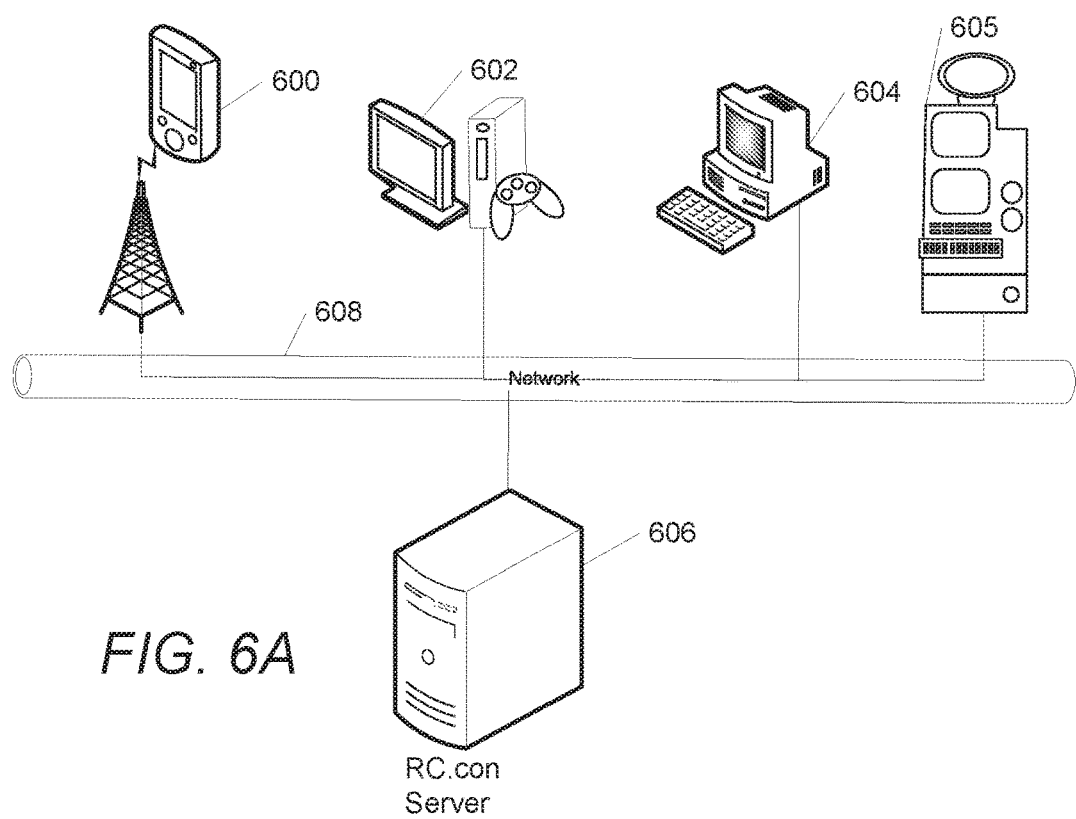
FIGS. 6A, 6B and 6C illustrate embodiments of a distributed pre-authorized transaction interleaved wagering system in accordance with embodiments of the invention.

Some pre-authorized transaction interleaved wagering systems in accordance with many embodiments of the invention can be networked with remote servers in various configurations. A networked pre-authorized transaction interleaved wagering system in accordance with an embodiment of the invention is illustrated in FIG. 6A. As illustrated, one or more end devices of networked pre-authorized transaction interleaved wagering systems such as a mobile device 600, a gaming console 602, a personal computer 604, and an electronic gaming machine 605 are connected with a RC.con server 606 over a network 608. Network 608 is a communications network that allows processing systems to share data. Examples of the network 608 can include, but are not limited to, a Local Area Network (LAN) and a Wide Area Network (WAN). In some embodiments, the processes of an Eg and a GW.con as described herein are executed on the individual end devices 600, 602, 604 and 605 while the processes of the RC.con as described herein can be executed by the RC.con server 606.

Figure 6B:
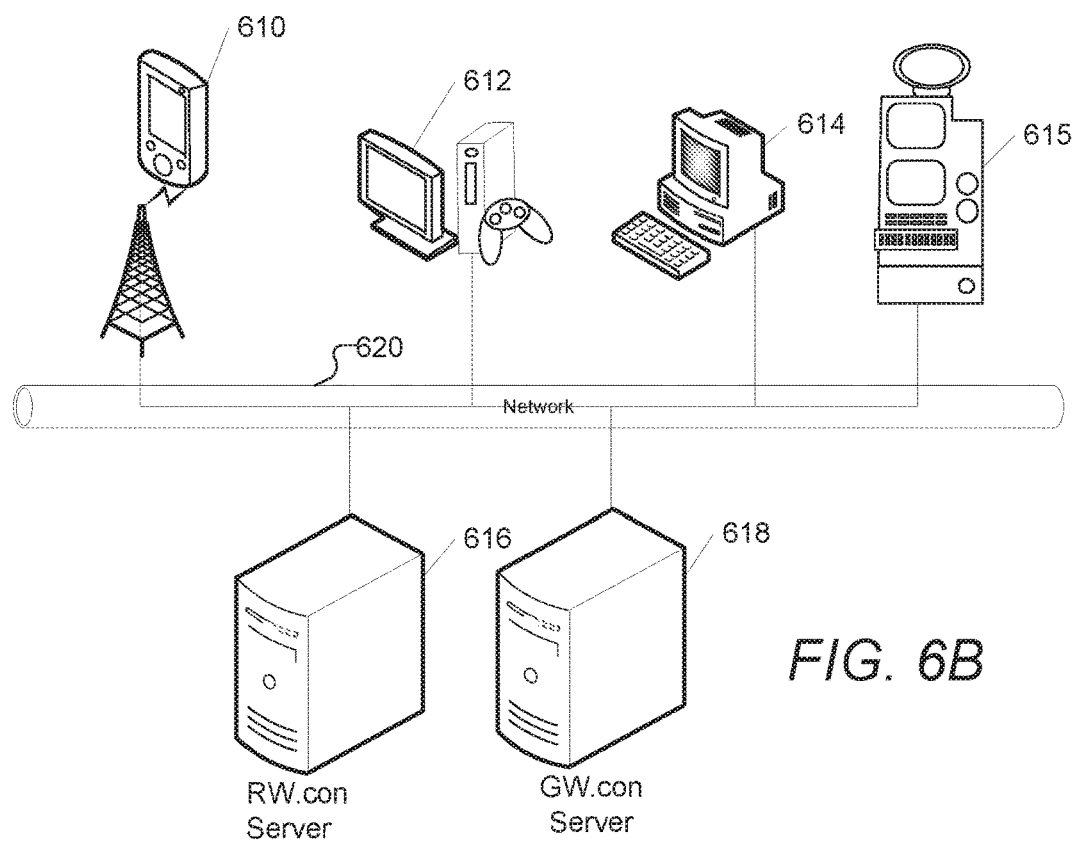

A networked pre-authorized transaction interleaved wagering system in accordance with another embodiment of the invention is illustrated in FIG. 6B. As illustrated, one or more end devices of networked pre-authorized transaction interleaved wagering systems, such as a mobile device 610, a gaming console 612, a personal computer 614, and an electronic gaming machine 615, are connected with an RC.con server 616 and a GW.con server 618 over a network 620. Network 620 is a communications network that allows processing systems to share data. Examples of the network 620 can include, but are not limited to, a Local Area Network (LAN) and a Wide Area Network (WAN). In some embodiments, the processes of an Eg as described herein are executed on the individual end devices 610, 612, 614 and 615. The processes of the RC.con as described herein are executed by the RC.con server 616 and the processes of the GW.con as described herein are executed by the GW.con server 618.

Figure 6C:
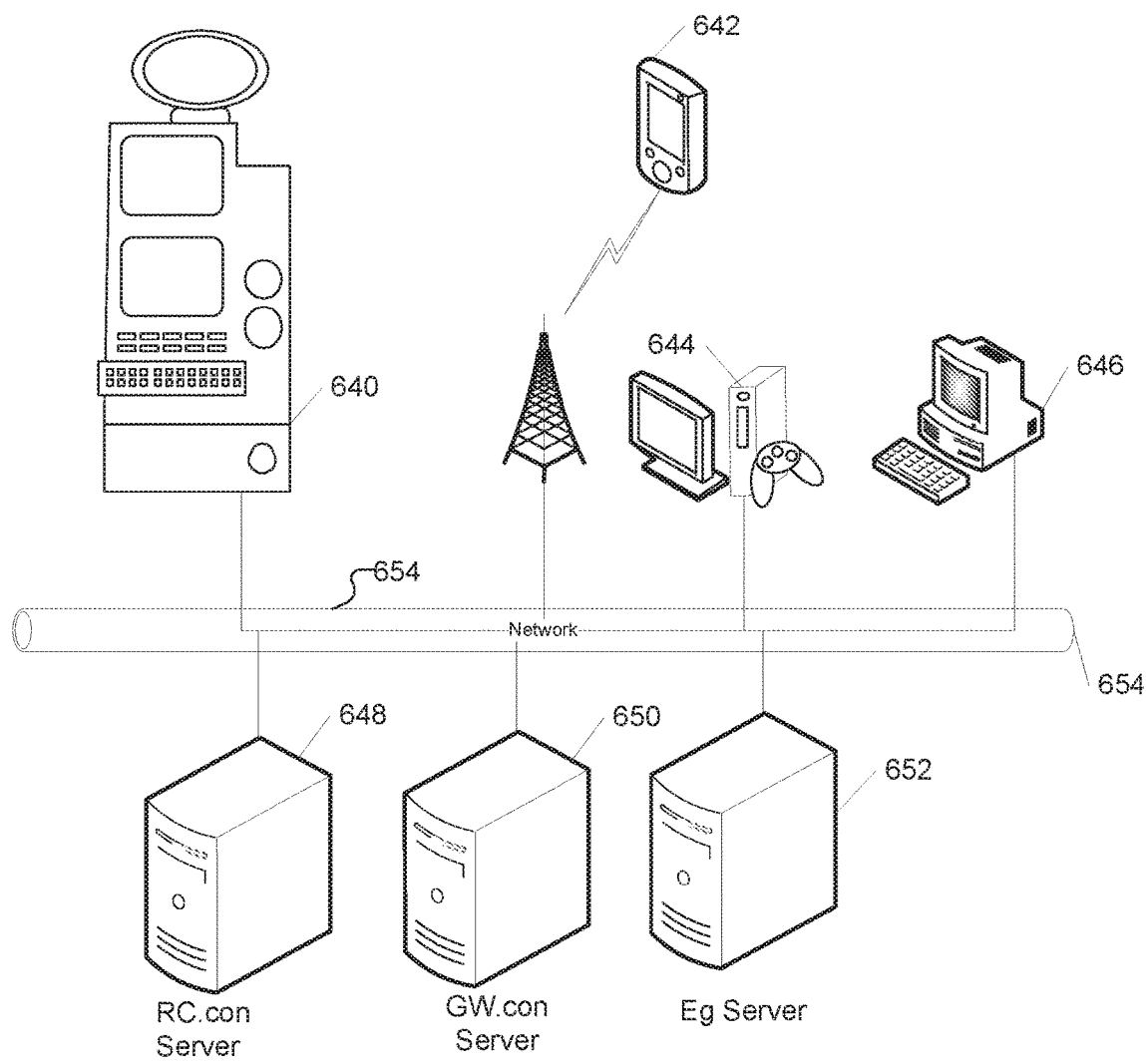

A networked pre-authorized transaction interleaved wagering systems in accordance with still another embodiment of the invention is illustrated in FIG. 6C. As illustrated, one or more end devices of networked pre-authorized transaction interleaved wagering systems, such as a mobile device 642, a gaming console 644, a personal computer 646, and an electronic gaming machine 640 are connected with an RC.con server 648 and a GW.con server 650, and an Eg server 652 over a network 654. Network 654 is a communications network that allows processing systems to share data. Examples of the network 654 can include, but are not limited to, a Local Area Network (LAN) and a Wide Area Network (WAN). In some embodiments, the processes of a display and player interface of an Eg as described herein are executed on the individual end devices 640, 642, 644 and 646. The processes of the RC.con as described herein can be executed by the RC.con server 648. The processes of the GW.con as described herein can be executed by the GW.con server 650 and the processes of an Eg excluding the display and player interfaces can be executed by the Eg server 652.

In various embodiments, a patron management server may be operatively connected to components of a pre-authorized transaction interleaved wagering system via a network. In other embodiments, a number of other peripheral systems, such as a player management system, a gaming establishment management system, a regulatory system, and/or hosting servers can also interface with the pre-authorized transaction interleaved wagering systems over a network within a firewall of an operator. Also, other servers can reside outside the bounds of a network within a firewall of the operator to provide additional services for network connected pre-authorized transaction interleaved wagering systems.

In numerous embodiments, a network distributed pre-authorized transaction interleaved wagering system can be implemented on multiple different types of devices connected together over a network. Any type of device can be utilized in implementing a network distributed pre-authorized transaction interleaved wagering system such as, but not limited to, a gaming cabinet as used in a traditional land-based gaming establishment, a mobile processing device (such as, but not limited to a PDA, smartphone, tablet computer, or laptop computer), and a game console (such as but not limited to a Sony PlayStation®, or Microsoft Xbox®) or on a Personal Computer (PC). Each of the devices may be operatively connected to other devices or other systems of devices via a network for the playing of head-to-head games.

Although various networked pre-authorized transaction interleaved wagering systems are discussed above, pre-authorized transaction interleaved wagering systems can be networked in any configuration as appropriate to the specification of a specific application in accordance with embodiments of the invention. In some embodiments, components of a networked pre-authorized transaction interleaved wagering system, such as a GW.con, RC.con, Eg, or other servers that perform services for a GW.con, RC.con and/or Eg, can be networked in different configurations for a specific networked pre-authorized transaction interleaved wagering system gameplay application. pre-authorized transaction interleaved wagering system implementations are discussed herein. Processing apparatuses that can be utilized in the implementation of pre-authorized transaction interleaved wagering system are discussed below.

Processing Devices

Any of a variety of processing devices can be used to host various components of a pre-authorized transaction interleaved wagering system in accordance with embodiments of the invention.

Figure 7A:
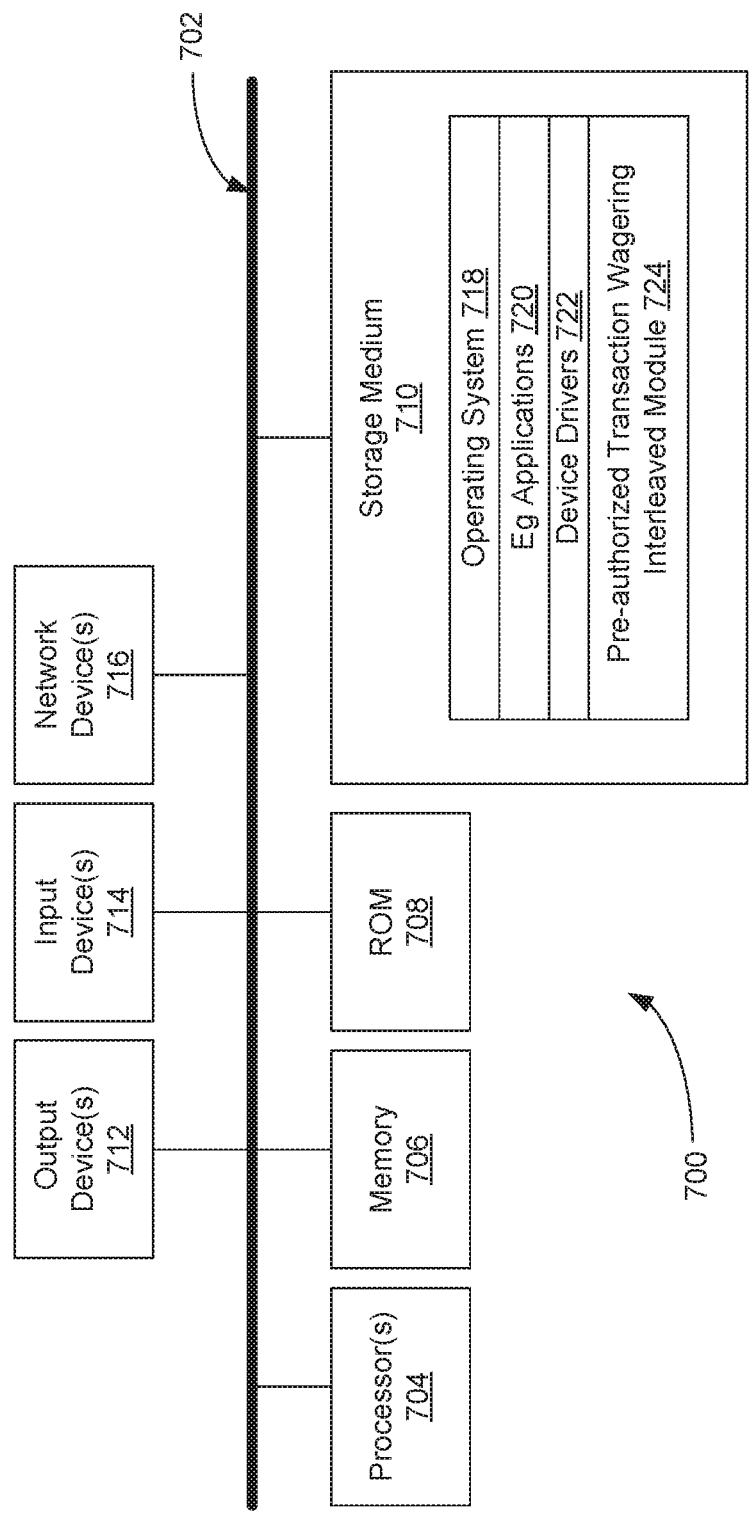
FIG. 7A illustrates a block diagram of components of a processing device of an Eg of a pre-authorized transaction interleaved wagering system in accordance with various embodiments of the invention.

FIG. 7A is an architecture diagram of processing device suitable for hosting an implementation of an Eg in accordance with embodiments of the invention. In some embodiments, the processing device 700 is any suitable type of device, such as but not limited to: a mobile device such as a smartphone; a personal digital assistant; a wireless device such as a tablet computer or the like; an electronic gaming machine; a personal computer; a gaming console; a set-top box; a computing device and/or a controller; and the like.

In the illustrated embodiment, a bus 702 provides an interface for one or more processors 704, random access memory (RAM) 706, read only memory (ROM) 708, machine-readable storage medium 710, one or more user output devices 712, one or more user input devices 714, and one or more network devices 716.

The one or more processors 704 may take many forms, such as, but not limited to: a central processing unit (processor); a multi-processor unit (MPU); an ARM processor; and the like.

Examples of output devices 712 include, include, but are not limited to: display screens; light panels; and/or lighted displays. In accordance with particular embodiments, the one or more processors 704 are operatively connected to audio output devices such as, but not limited to: speakers; and/or sound amplifiers. In accordance with many of these embodiments, the one or more processors 704 are operatively connected to tactile output devices like vibrators, and/or manipulators.

Examples of user input devices 714 include, but are not limited to: tactile devices including but not limited to, keyboards, keypads, foot pads, touch screens, and/or trackballs; non-contact devices such as audio input devices; motion sensors and motion capture devices that the processing device can use to receive inputs from a user when the user interacts with the processing device.

The one or more network devices 716 provide one or more wired or wireless interfaces for exchanging data and commands between the processing device 700 and other devices that may be included in a pre-authorized transaction interleaved wagering system system. Such wired and wireless interfaces include, but are not limited to: a Universal Serial Bus (USB) interface; a Bluetooth interface; a Wi-Fi interface; an Ethernet interface; a Near Field Communication (NFC) interface; a POTS, cellular or satellite telephone network; and the like.

The machine-readable storage medium 710 stores machine-executable instructions for various components of the Eg, such as but not limited to: an operating system 718, Eg application programs 720, and device drivers 722. A pre-authorized transaction interleaved wagering system module 724 includes machine-executable instructions for controlling the one or more processors 704 to control the processing device 700 as described herein.

In various embodiments, the machine-readable storage medium 710 is one of a (or a combination of two or more of) a hard drive, a flash drive, a DVD, a CD, a flash storage, a solid state drive, a ROM, an EEPROM, and the like.

In operation, the machine-executable instructions are loaded into memory 706 from the machine-readable storage medium 710, the ROM 708 or any other storage location. The respective machine-executable instructions are accessed by the one or more processors 704 via the bus 702, and then executed by the one or more processors 704. Data used by the one or more processors 704 are also stored in memory 706, and such data is accessed by the one or more processors 704 during execution of the machine-executable instructions. Execution of the machine-executable instructions causes the one or more processors 704 to control the processing device 700 as described herein Although the processing device 700 is described herein as being constructed from one or more processors and instructions stored and executed by hardware components, the processing device can be composed of only hardware components in accordance with other embodiments. In addition, although the storage medium 710 is described as being operatively connected to the one or more processors through a bus, those skilled in the art of processing devices will understand that the storage medium can include removable media such as, but not limited to, a USB memory device, an optical CD ROM, magnetic media such as tape and disks. Also, the storage medium 710 can be accessed by processor 704 through one of the interfaces or over a network. Furthermore, any of the user input devices or user output devices can be operatively connected to the one or more processors 704 via one of the interfaces or over a network.

In some embodiments, the processing device can be distributed across several different devices. In many such embodiment, the Eg includes a game server operatively connected to a game client over a network. The game server and game client cooperate to provide the functions of an Eg as described herein.

Figure 7B:
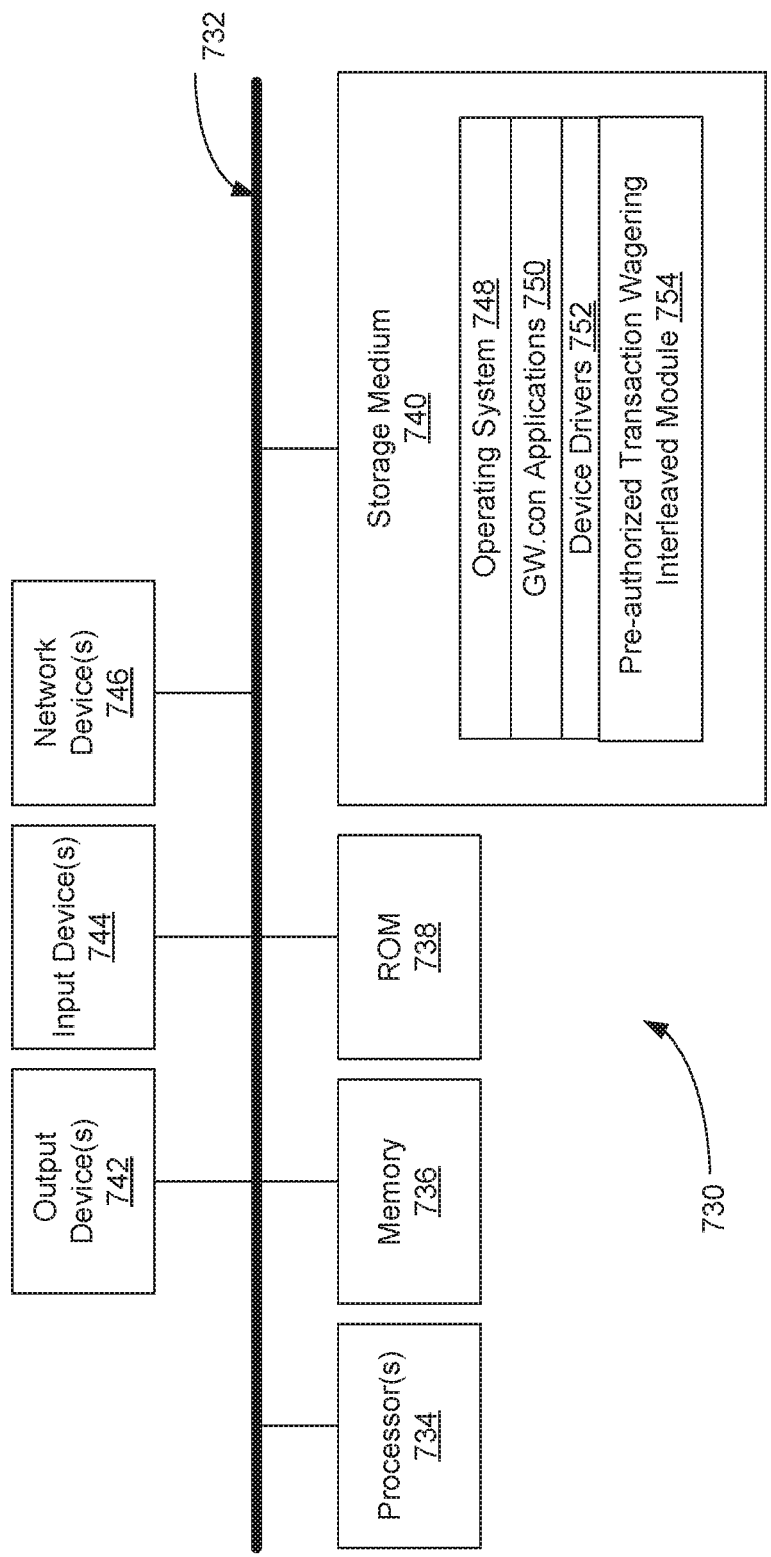
FIG. 7B illustrates a block diagram of components of a GW.con processing device of a pre-authorized transaction interleaved wagering system in accordance with various embodiments of the invention.

FIG. 7B is an architecture diagram of a processing device 730 suitable for hosting an implementation of a GW.con in accordance with embodiments of the invention. In some embodiments, the processing device 730 is any suitable type of device, such as but not limited to: a server; a mobile device such as a smartphone; a personal digital assistant; a wireless device such as a tablet computer or the like; an electronic gaming machine; a personal computer; a gaming console; a set-top box; a computing device and/or a controller; and the like. In the illustrated embodiment, a bus 732 provides an interface for one or more processors 734, random access memory (RAM) 736, read only memory (ROM) 738, machine-readable storage medium 740, one or more user output devices 742, one or more user input devices 744, and one or more network devices 746.

The one or more processors 734 may take many forms, such as, but not limited to: a central processing unit (processor); a multi-processor unit (MPU); an ARM processor; and the like.

Examples of output devices 742 include, include, but are not limited to: display screens; light panels; and/or lighted displays. In accordance with particular embodiments, the one or more processors 734 are operatively connected to audio output devices such as, but not limited to: speakers; and/or sound amplifiers. In accordance with many of these embodiments, the one or more processors 734 are operatively connected to tactile output devices like vibrators, and/or manipulators.

Examples of user input devices 734 include, but are not limited to: tactile devices including but not limited to, keyboards, keypads, touch screens, and/or trackballs; non-contact devices such as audio input devices; motion sensors and motion capture devices that the processing device can use to receive inputs from a user when the user interacts with the processing device.

The one or more network devices 736 provide one or more wired or wireless interfaces for exchanging data and commands between the processing device 730 and other devices that may be included in a pre-authorized transaction interleaved wagering system system. Such wired and wireless interfaces include, but are not limited to: a Universal Serial Bus (USB) interface; a Bluetooth interface; a Wi-Fi interface; an Ethernet interface; a Near Field Communication (NFC) interface; a POTS, cellular or satellite telephone network; and the like.

The machine-readable storage medium 740 stores machine-executable instructions for various components of the GW.con and/or RC.con, such as but not limited to: an operating system 748, GW.con application programs 750, and device drivers 752. A pre-authorized transaction interleaved wagering system module 754 includes machine-executable instructions for controlling the one or more processors 734 to control a GW. as described herein.

In various embodiments, the machine-readable storage medium 740 is one of a (or a combination of two or more of) a hard drive, a flash drive, a DVD, a CD, a flash storage, a solid state drive, a ROM, an EEPROM, and the like.

In operation, the machine-executable instructions are loaded into memory 736 from the machine-readable storage medium 740, the ROM 738 or any other storage location. The respective machine-executable instructions are accessed by the one or more processors 734 via the bus 732, and then executed by the one or more processors 734. Data used by the one or more processors 734 are also stored in memory 736, and such data is accessed by the one or more processors 734 during execution of the machine-executable instructions. Execution of the machine-executable instructions causes the one or more processors 734 to control the processing device 730 as described herein Although the processing device 730 is described herein as being constructed from one or more processors and machine-executable instructions stored and executed by hardware components, the processing device can be composed of only hardware components in accordance with other embodiments. In addition, although the storage medium 740 is described as being operatively connected to the one or more processors through a bus, those skilled in the art of processing devices will understand that the storage medium can include removable media such as, but not limited to, a USB memory device, an optical CD ROM, magnetic media such as tape and disks. Also, the storage medium 740 can be accessed by the one ore more processors 734 through one of the interfaces or over a network. Furthermore, any of the user input devices or user output devices can be operatively connected to the one or more processors 734 via one of the interfaces or over a network.

Figure 7C:
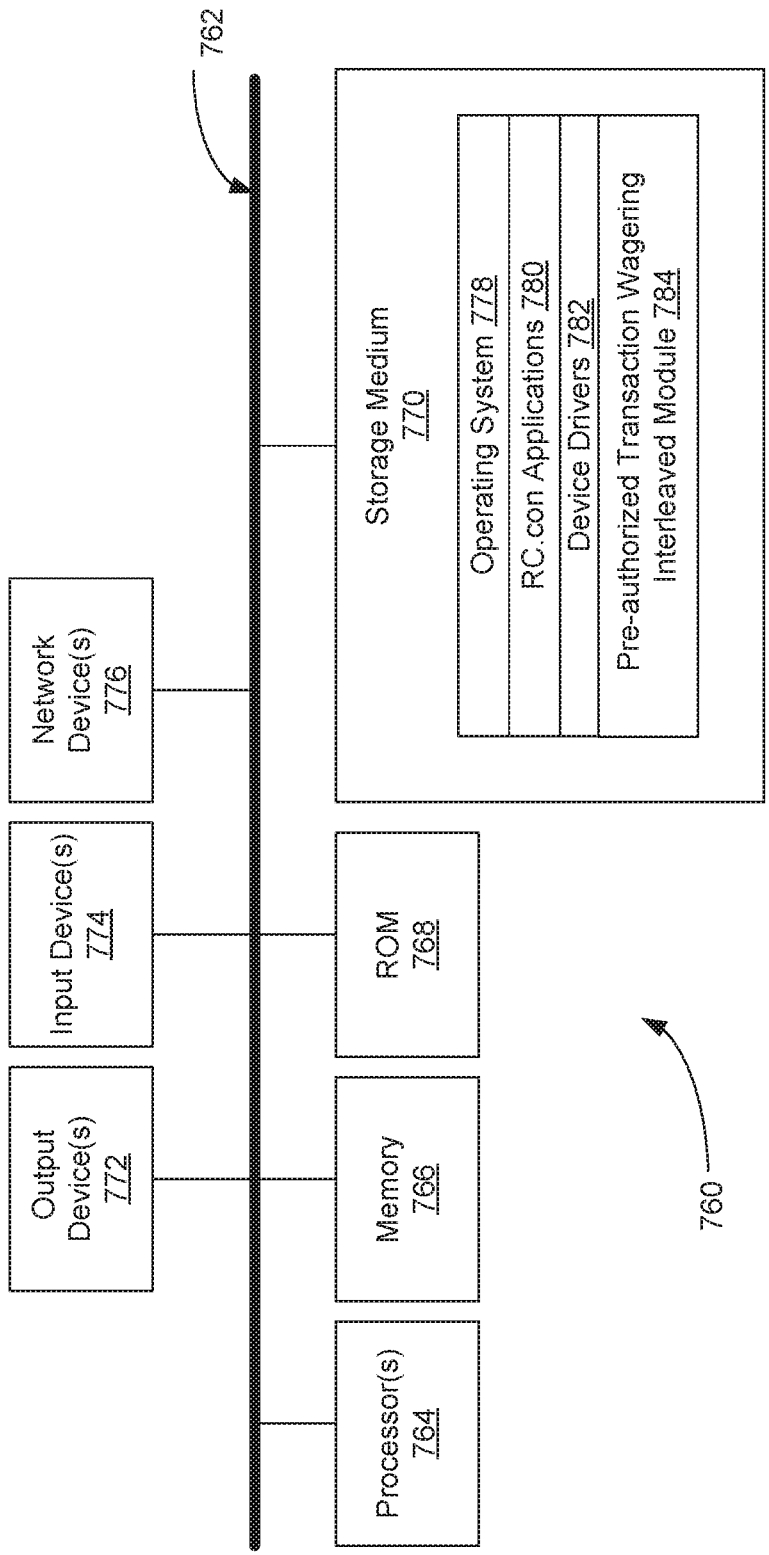
FIG. 7C illustrates a block diagram of components of a RC.con processing device of a pre-authorized transaction interleaved wagering system in accordance with various embodiments of the invention.

FIG. 7C is an architecture diagram of a processing device suitable for hosting an implementation of an RC.con in accordance with embodiments of the invention. In some embodiments, the processing device 760 is any suitable type of device, such as but not limited to: a mobile device such as a smartphone; a personal digital assistant; a wireless device such as a tablet computer or the like; an electronic gaming machine; a personal computer; a gaming console; a set-top box; a computing device and/or a controller; and the like.

In the illustrated embodiment, a bus 762 provides an interface for one or more processors 764, random access memory (RAM) 766, read only memory (ROM) 768, machine-readable storage medium 770, one or more user output devices 772, one or more user input devices 774, and one or more network devices 776.

The one or more processors 764 may take many forms, such as, but not limited to: a central processing unit (processor); a multi-processor unit (MPU); an ARM processor; and the like.

Examples of output devices 772 include, include, but are not limited to: display screens; light panels; and/or lighted displays. In accordance with particular embodiments, the one or more processors 764 are operatively connected to audio output devices such as, but not limited to: speakers; and/or sound amplifiers. In accordance with many of these embodiments, the one or more processors 764 are operatively connected to tactile output devices like vibrators, and/or manipulators.

Examples of user input devices 774 include, but are not limited to: tactile devices including but not limited to, keyboards, keypads, foot pads, touch screens, and/or trackballs; non-contact devices such as audio input devices; motion sensors and motion capture devices that the processing device can use to receive inputs from a user when the user interacts with the processing device.

The one or more network devices 776 provide one or more wired or wireless interfaces for exchanging data and commands between the processing device 760 and other devices that may be included in a pre-authorized transaction interleaved wagering system system. Such wired and wireless interfaces include, but are not limited to: a Universal Serial Bus (USB) interface; a Bluetooth interface; a Wi-Fi interface; an Ethernet interface; a Near Field Communication (NFC) interface; a POTS, cellular or satellite telephone network; and the like.

The machine-readable storage medium 770 stores machine-executable instructions for various components of the RC.con, such as but not limited to: an operating system 778, RC.con application programs 780, and device drivers 782. A pre-authorized transaction interleaved wagering system module 784 includes machine-executable instructions for controlling the one or more processors 764 to control the processing device 760 as described herein.

In various embodiments, the machine-readable storage medium 770 is one of a (or a combination of two or more of) a hard drive, a flash drive, a DVD, a CD, a flash storage, a solid state drive, a ROM, an EEPROM, and the like.

In operation, the machine-executable instructions are loaded into memory 766 from the machine-readable storage medium 770, the ROM 768 or any other storage location. The respective machine-executable instructions are accessed by the one or more processors 764 via the bus 762, and then executed by the one or more processors 764. Data used by the one or more processors 764 are also stored in memory 766, and such data is accessed by the one or more processors 764 during execution of the machine-executable instructions. Execution of the machine-executable instructions causes the one or more processors 764 to control the processing device 700 as described herein Although the processing device 760 is described herein as being constructed from one or more processors and instructions stored and executed by hardware components, the processing device can be composed of only hardware components in accordance with other embodiments. In addition, although the storage medium 770 is described as being operatively connected to the one or more processors through a bus, those skilled in the art of processing devices will understand that the storage medium can include removable media such as, but not limited to, a USB memory device, an optical CD ROM, magnetic media such as tape and disks. Also, the storage medium 770 can be accessed by processor 764 through one of the interfaces or over a network. Furthermore, any of the user input devices or user output devices can be operatively connected to the one or more processors 764 via one of the interfaces or over a network.

In numerous embodiments, any of an RC.con, GW.con or Eg as described herein can be implemented on multiple processing devices, whether dedicated, shared, or distributed in any combination thereof, or can be implemented on a single processing device. In addition, while certain aspects and features of pre-authorized transaction interleaved wagering system processes described herein have been attributed to an RC.con, GW.con, or Eg, these aspects and features can be implemented in a distributed form where any of the features or aspects can be performed by any of a RC.con, GW.con, and/or Eg within a pre-authorized transaction interleaved wagering system without deviating from the spirit of the invention.

Pre-Authorized Transaction Interleaved Wagering System Implementations

Figure 8:
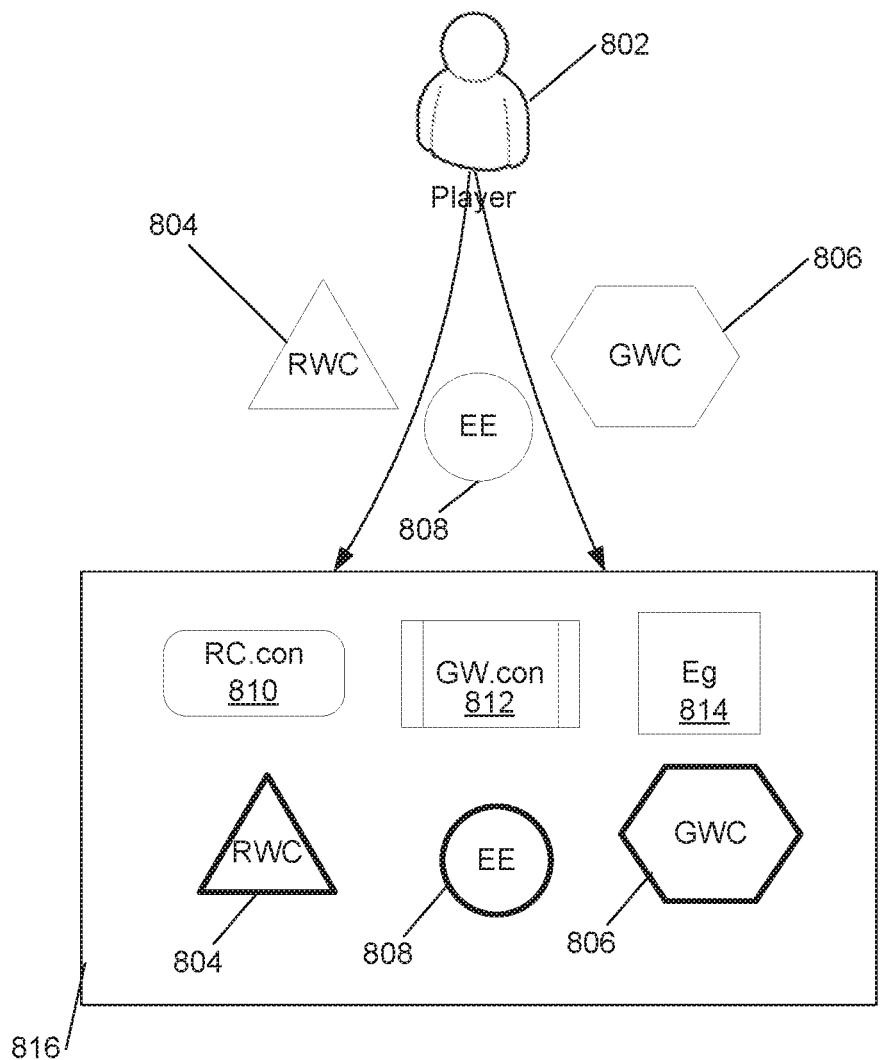
FIG. 8 illustrates a conceptual diagram of components of a pre-authorized transaction interleaved wagering system in accordance with an embodiment of the invention.

In several embodiments, a player can interact with a pre-authorized transaction interleaved wagering system by using RC for wagering within a gambling game along with GWC and elements in interactions with an interactive entertainment game. The gambling game can be executed by a RC.con while an interactive entertainment game can be executed with an Eg and managed with a GW.con. A conceptual diagram that illustrates how resources such as GWC, RC and elements, such as but not limited to EE, are utilized in a pre-authorized transaction interleaved wagering system in accordance with an embodiment of the invention is illustrated in FIG. 8. The conceptual diagram illustrates that RC 804, element E 808 and GWC 806 can be utilized by a player 802 in interactions with the RC.con 810, GW.con 812 and Eg 814 of a pre-authorized transaction interleaved wagering system 816. The contribution of elements, such as E 808, can be linked to a player's access to credits, such as RC 804 and/or GWC 806. Electronic receipt of these credits can come via a smart card, voucher or other portable media, or as received over a network from a server. In some embodiments, these credits can be drawn on demand from a player profile located in a database locally on a pre-authorized transaction interleaved wagering system or in a remote server.

Figure 9:
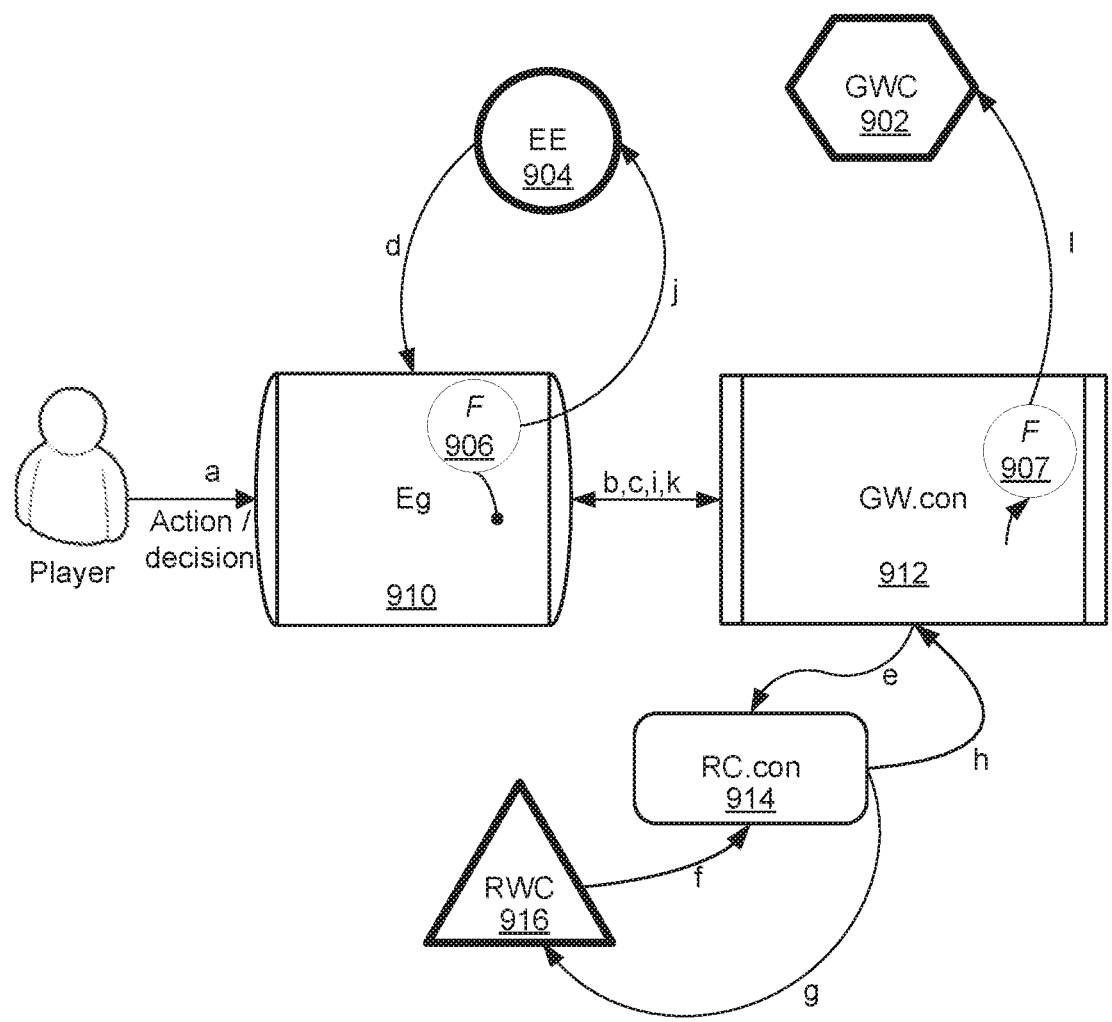
FIG. 9 illustrates a conceptual diagram of the interplay between aspects of a pre-authorized transaction interleaved wagering system using Real World Currency (RC) in accordance with some embodiments of the invention.

A conceptual diagram that illustrates interplay between elements and components of a pre-authorized transaction interleaved wagering system in accordance with an embodiment of the invention is illustrated in FIG. 9. Similar to FIG. 8, a player's actions and/or decisions can affect functions 906 and 907 that consume and/or accumulate GWC 902 and/or E 904 in an interactive entertainment game executed by an Eg 910, a RC.con 914 and a GW.con 912. The GW.con 912 can monitor the activities taking place within an interactive entertainment game executed by an Eg 910 for gameplay gambling event occurrences. The GW.con 912 can also communicate the gameplay gambling event occurrences to the RC.con 914 that triggers a gambling event and/or wager of RC 916 in a gambling game executed by the RC.con 914.

In the illustrated example, the player commences interaction with the pre-authorized transaction interleaved wagering system by contributing one or more of three types of credits to the pre-authorized transaction interleaved wagering system: (i) RC 916 which is a currency fungible instrument, (ii) GWC 902 which are game world credits, and (iii) E 904 which is an element of the entertainment portion of the pre-authorized transaction interleaved wagering system executed by the Eg. In many embodiments, an element is an element consumed by, traded or exchanged in, operated upon, or used by the player during the player's play of the interactive entertainment game portion of the pre-authorized transaction interleaved wagering system. There may be one or more types of E present in a pre-authorized transaction interleaved wagering system's entertainment game. Embodiments of E include, but are not limited to, bullets in a shooting game, fuel in a racing game, letters in a word spelling game, downs in a football game, potions in a character adventure game, and/or character health points, etc.

The contribution of one or more of these elements may be executed by insertion into the pre-authorized transaction interleaved wagering system of currency in the case of RC, and/or transferred in as electronic credit in the case of any of the RC, GWC and/or E. Electronic transfer in of these credits may come via a smart card, voucher or other portable media, or as transferred in over a network from a patron server or pre-authorized transaction interleaved wagering system player account server. In many embodiments, these credits may not be transferred into the pre-authorized transaction interleaved wagering system. Instead the credits may be drawn on demand from player accounts located in servers residing on the network or in the cloud on a real time basis as the credits are consumed by the pre-authorized transaction interleaved wagering system. Once these credits are deposited, or a link to their availability is made, the pre-authorized transaction interleaved wagering system has the credits at its disposal to use for execution of the pre-authorized transaction interleaved wagering system. Generally, the RC is utilized and accounted for by the RC.con 914; and the E 904 and GWC 902 are utilized and accounted for by the GW.con 912 and/or the Eg 910.

In accordance with some embodiments of the invention, the following may occur during use of the pre-authorized transaction interleaved wagering system. The user enters an input that represents an action or decision (950). The Eg 910 signals the GW.con 912 with the input decision or action (952). The GW.con 912 responds by signaling to the Eg 910 the amount of E that is consumed by the player action or decision (954). The signaling from the GW.con 912 configures a function 906 to control the E consumption, decay, and/or accumulation.

The Eg 910 then adjusts the E 904 accordingly (956). The GW.con 912 signals the RC.con 914 as to the profile of the wager proposition associated with the action or decision and triggers a gambling event and the wager (958). The RC.con 914 consumes the appropriate amount of RC 916, executes the gambling event and resolves the wager (960). The RC.con 914 then adjusts the RC 916 based upon the outcome of the wager (962) and informs the GW.con 912 as to the outcome of the wager (964).

The GW.con 912 signals the Eg 910 to adjust E to one or more of the Es of the Eg entertainment game (966). Function 906 of the Eg 910 performs the adjustment of E 904 (968). The Eg 910 signals the GW.con 912 as to the updated status (970). In response, the GW.con 912 updates the GWC 902 using a function 907 (972) and may provide an update of the GWC to the Eg 910.

The following is an example of the above flow in a first person shooter game, such as Call of Duty®, using a pre-authorized transaction interleaved wagering system sequence in accordance with embodiments of the invention.

The process begins by a player selecting a machine gun to use in the game and then fires a burst of bullets at an opponent (950). The Eg 910 can signal to the GW.con 912 of the player's choice of weapon, that a burst of bullets was fired, and/or the outcome of the burst (952). The GW.con 912 processes the information received and signals the Eg 910 to consume 3 bullets (E) with each pull of the trigger (954). The Eg 910 consumes 3 bullets for the burst using function 906 (956).

The GW.con 912 signals the RC.con 914 that 3 credits (RC) are to be wagered on the outcome of a gambling event to match the three bullets consumed. The RC.con 914 then performs the gambling event and determines the result of the wager and may determine the winnings from a pay table. The RC.con 914 consumes 3 credits of RC 916 for the wager and executes the specified wager (960). By way of example, the RC.con 914 may determine that the player hit a jackpot of 6 credits and returns the 6 credits to the RC 916 (962) and signals the GW.con 912 that 3 net credits were won by the player (964).

The GW.con 912 signals the Eg 910 to add 3 bullets to an ammunition clip (966). The Eg 910 adds 3 bullets back to the ammo clip (E 904) using a function 906 (968). The ammunition may be added by directly adding the ammunition to the clip or by allowing the user to find extra ammunition during gameplay. The GW.con 912 logs the new player score (GWC 902) in the game (as a function of the successful hit on the opponent) based on the Eg 910 signaling, and adds 2 extra points to the player score since a jackpot has been won (970). The GW.con then adds 10 points to the player score (GWC 902) given the success of the hit which in this example is worth 8 points, plus the 2 extra points (972). Note that the above example is only intended to provide an illustration of how credits flow in a pre-authorized transaction interleaved wagering system, but is not intended to be exhaustive and only lists only one of numerous possibilities of how a pre-authorized transaction interleaved wagering system may be configured to manage its fundamental credits.

Note that the foregoing embodiments are intended to provide an illustration of how credits flow in a pre-authorized transaction interleaved wagering system, but are not intended to be exhaustive, and only list one of numerous possibilities of how a pre-authorized transaction interleaved wagering system may be configured to manage its fundamental credits.

In accordance with some embodiments, the pre-authorized transaction interleaved wagering system system of FIG. 9 may provide a pre-authorized transaction interleaved wagering system with virtual currency versus using RC. Virtual currency can be thought of as a form of alternate currency which can be acquired, purchased or transferred in unit or in bulk by/to a player but does not necessarily directly correlate to RC or real currency. In a number of embodiments, there is a virtual currency called "Triax Jacks". 1000 units of "Triax Jacks" are given to a player by an operator of a pre-authorized transaction interleaved wagering system with additional blocks of 1000 units being available for purchase for $5 USD for each block. Triax Jacks could be redeemed for various prizes. Alternatively, the Triax Jacks could never be redeemed but simply used and traded purely for entertainment value by players. It would be completely consistent with the architecture of the pre-authorized transaction interleaved wagering system that Triax Jacks would be wagered in place of RC such that the pre-authorized transaction interleaved wagering system could be played for free or with played with operator sponsored Triax Jacks.

Figure 10A:
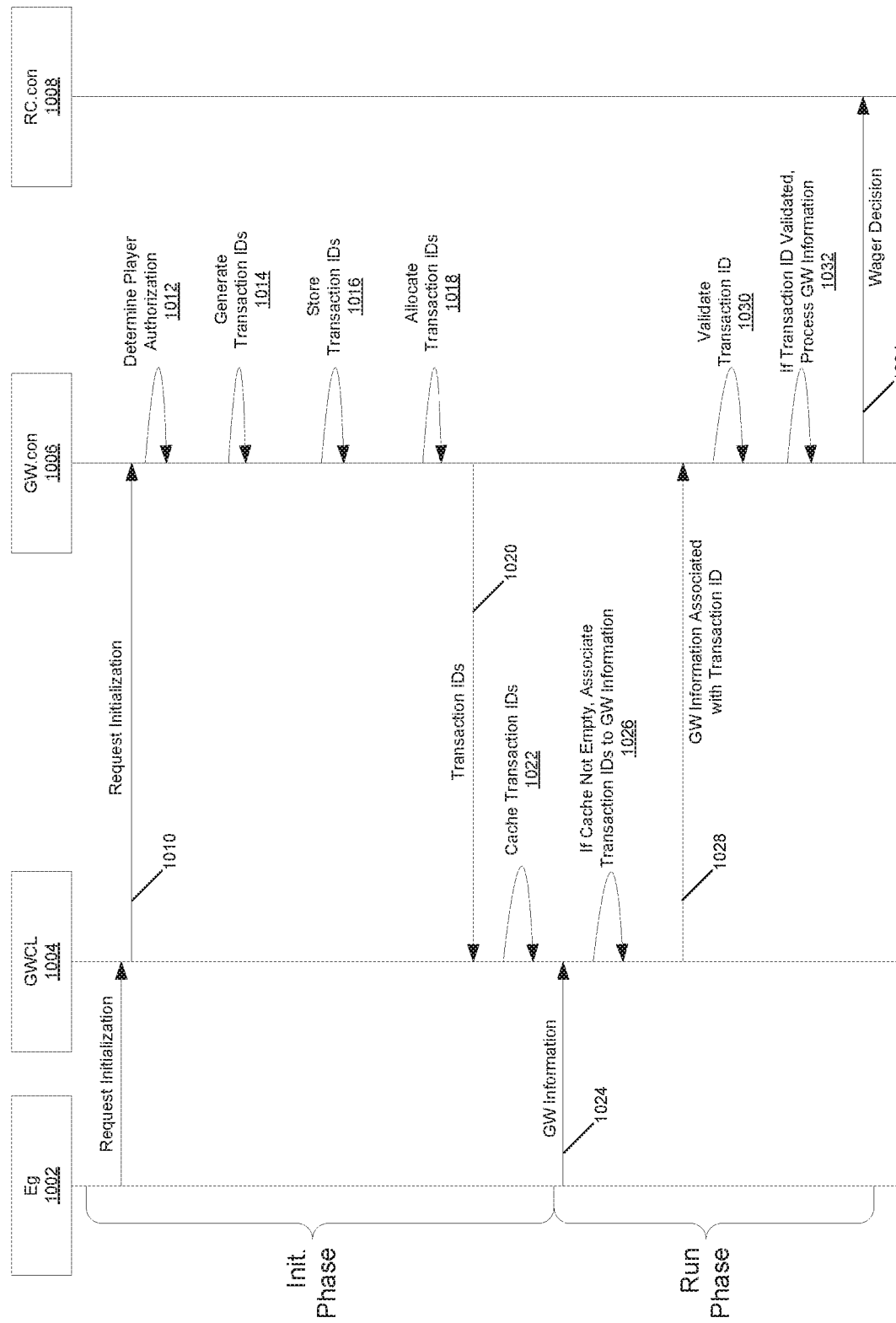
FIGS. 10A and 10B illustrate a process of pre-authorization of transactions for a skill interleaved wagering game in accordance with embodiments of the invention.
Figure 10B:
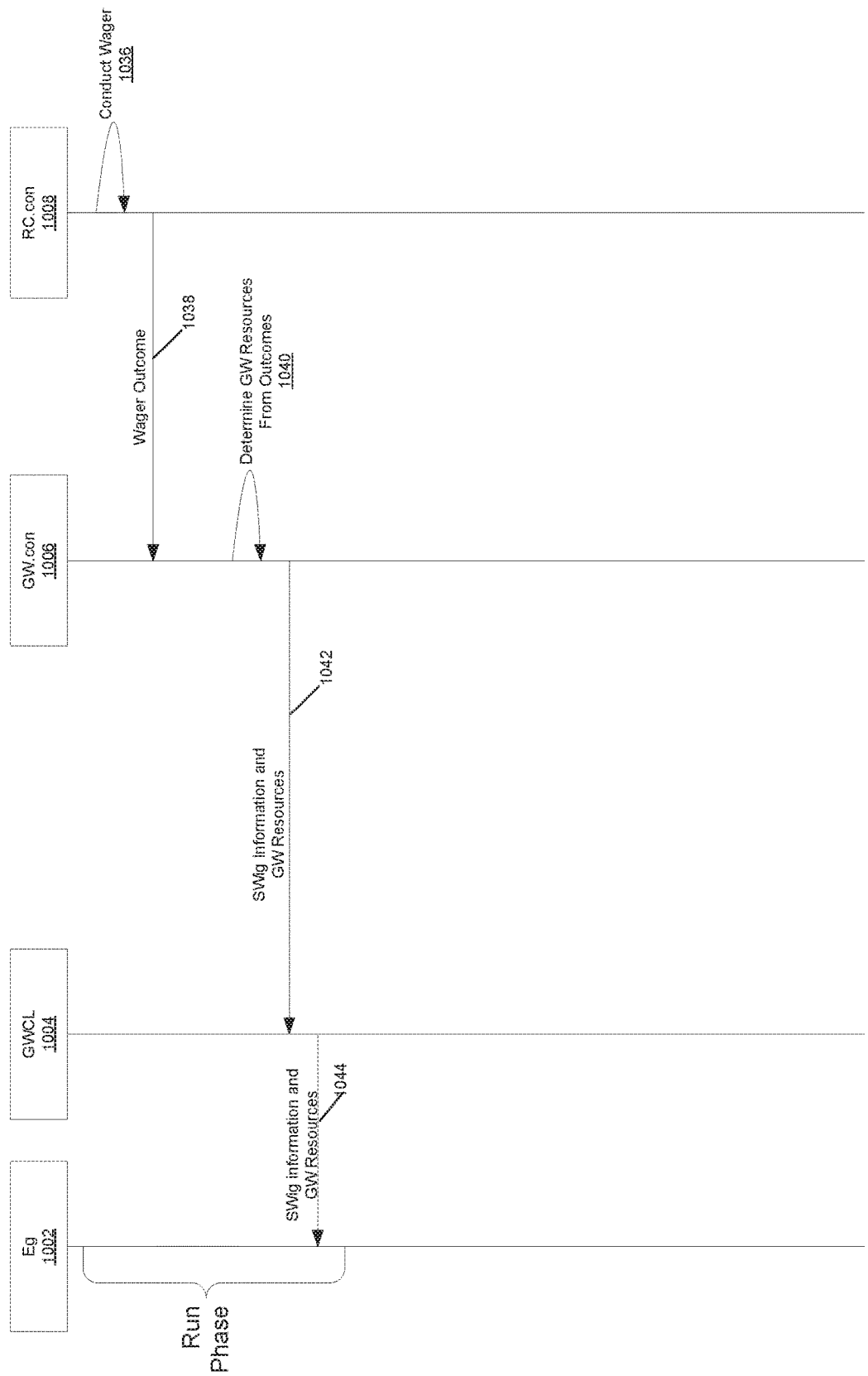

FIGS. 10A and 10B illustrate a process of pre-authorization of transactions for a skill interleaved wagering game as implemented by a pre-authorized transaction interleaved wagering system in accordance with embodiments of the invention. As depicted in FIGS. 10A and 10B, an entertainment game (Eg) 1002 interfaces with a game world controller (GW.con) 1006 using a game world control layer (GWCL) 1004. In some embodiments, a GWCL 1004 is responsible for providing initial processing for some transactions between the Eg 1002 and the GW.con 1006. In the illustrated process 1000, the GWCL 1004 provides processing for pre-authorized transactions. In the process 1000, in an initialization phase, the Eg 1002 communicates a request for initialization from the GW.con 1006 through the GWCL 1004 (1010). In some embodiments, the initialization request also includes player information that is used to authenticate a player to the skill interleaved wagering game. The player information can be used, for example, to establish the identity of the player, determine if the player is authorized to play the skill interleaved wagering game, and access account information indicating an account containing real credits that the player will be wagering in the skill interleaved wagering game.

The GW.con 1006 receives the request information 1010 and determines whether the player is authorized to play the skill interleaved wagering game, based on the initialization request (1012). As described herein, the initialization request may include player information used to authenticate the player to the skill interleaved wagering game.

When the player is authorized by the GW.con 1006, the GW.con 1006 generates pre-authorized transaction identifiers (1014) and stores the generated pre-authorized transaction identifiers for later use (1016). The pre-authorized transaction identifiers may be stored locally or remotely. In some embodiments, each pre-authorized transaction identifier is a unique digital value that is generated by the GW.con 1006. In various embodiments, the unique digital value is unique over a particular domain. By way of example, the domains may include, but are not limited to: an individual gaming session; a player's lifetime of gaming transactions with the operator of the pre-authorized transaction interleaved wagering system; a player's lifetime of gaming transactions with a particular component of the pre-authorized transaction interleaved wagering system (such as the Eg 1002, the GW.con 1006 or the RC.con 1008); and all transactions with pre-authorized transaction interleaved wagering systems.

In some embodiments, the amount of pre-authorized transaction identifiers that is created may be based upon, but not limited to, factors such as: a type of skill based entertainment game provided by the Eg 1002 (for example, a turn based game may need fewer pre-authorized transaction identifiers than a first person shooter action game); and an amount of real world credit that the player has committed to the pre-authorized transaction interleaved wagering system, with more pre-authorized transaction identifiers being generated the more real world credits the player has committed.

The GW.con 1006 may allocate an amount of pre-authorized transaction identifiers for use by the GWCL 1004 to authorize game world information received from the Eg 1002 and communicated to the GW.con 1006 (1018). In some embodiments, the GW.con 1006 may generate a predetermined number of pre-authorized transaction identifiers and allocate all of the generated pre-authorized transaction identifiers for use by the GWCL 1004. In some embodiments, the GW.con 1006 may allocate fewer than all of the generated pre-authorized transaction identifiers to the GWCL 1004 and store the remaining, unallocated pre-authorized transaction identifiers. The unallocated pre-authorized transaction identifiers may be stored locally or remotely.

The GW.con 1006 communicates the allocated amount of generated pre-authorized transaction identifiers to the GWCL 1004 (1020). On receiving the pre-authorized transaction identifiers, the GWCL 1004 caches them for later use (1022).

During a game session phase, a player plays the skill wagering interleaved game provided by the pre-authorized transaction interleaved wagering system. As the player plays the skill wagering interleaved game, game world information is communicated to the GWCL 1004 by the Eg 1002 (1024). The GWCL 1004 receives the game world information and determines if the GWCL 1004 has any pre-authorized transaction identifiers left in the GWCL's 1004 cache (1026). If so, the GWCL 1004 associates a pre-authorized transaction identifier with the game world information.

In various embodiments, the pre-authorized transaction identifiers are associated with specified types of game world information that the GW.con 1006 may base a wager decision upon. The specified types of game world information may include, but are not limited to: in a turn based game, a pre-authorized transaction identifier may be associated to game world information indicating each time a player takes their turn; in a first person shooter game, pre-authorized transaction identifiers may be associated with game world information indicating each virtual round fired from a virtual weapon; in a racing game, pre-authorized transaction identifiers may be associated with an amount of virtual fuel consumed by a virtual car being driven by the player.

In various embodiments, certain game world information may not be associated with a pre-authorized transaction identifier. Game world information may not be associated with a pre-authorized transaction identifier if the game world information does not trigger a wager decision.

In some embodiments, once a pre-authorized transaction identifier is associated with game world information, the pre-authorized transaction identifier is not associated with subsequent game world information. That is, multiple pieces of game world information may not be associated with one common pre-authorized transaction identifier. In some embodiments, a used pre-authorized transaction identifier is removed from the cache of pre-authorized transaction identifiers on the GWCL 1004. In other embodiments, a used pre-authorized transaction identifier is marked with an indicator in the cache as being used.

In the case the GWCL 1004 does not have any additional pre-authorized transaction identifiers left in the GWCL's 1004 cache, the GWCL 1004 may communicate the game world information to the GW.con 1006 without a pre-authorized transaction identifier or with an associated null transaction identifier. In addition, the GWCL 1004 may communicate a request to the GW.con 1006 to generate and allocate more pre-authorized transaction identifiers to send to the GWCL 1004.

The GWCL 1004 communicates the game world information associated with the pre-authorized transaction identifier to the GW.con 1006 (1028). The GW.con 1006 receives the game world information from the GWCL 1004 and makes a determination of whether or not a pre-authorized transaction identifier is associated with the game world information. If a pre-authorized transaction identifier is associated with the received game world information, the GW.con 1006 validates the pre-authorized transaction identifier. In some embodiments, the GW.con 1006 validates the pre-authorized transaction identifier associated with the game world information by determining whether the pre-authorized transaction identifier is stored in the GW.con's 1006 own local data store of pre-authorized transaction identifiers. In some embodiments, the GW.con 1006 validates the pre-authorized transaction identifier by accessing a remote data store of generated pre-authorized transaction identifiers.

If the received pre-authorized transaction identifier is valid, the GW.con 1006 uses the game world information associated with the valid pre-authorized transaction identifier to make a wagering decision as described herein. In this way, the GW.con 1006 is able to verify the received game world information originated from a valid Eg 1002.

Once the wagering decision is made, the wagering decision is communicated (1034) by the GW.con 1006 to the RC.con 1008 which triggers a wager in the RC.con 1008 and the wagering outcome is processed as described herein. In some embodiments, the RC.con 1008 conducts a wager (1036) as described herein and communicates the wager outcome to the GW.con (1038). The GW.con 1006 receives the wager outcome determines game world resources based on the wager outcome received from RC.con 1008 (1040). The GW.con 1006 communicates (1034) the determined game world resources and the wager outcome as SWig information to the GWCL 1004, which the GWCL 1004 passes to the Eg 1002 (1036). The Eg receives the game world resources and the SWig information, displays the SWig information and incorporates the game world resources into the interactive entertainment game provided by the Eg.

If the game world information is not associated with a pre-authorized transaction identifier, or the pre-authorized transaction identifier cannot be validated, then the GW.con 1006 may make additional processing decisions. In some embodiments, the GW.con 1006 may treat the lack of a valid pre-authorized transaction identifier as an indication that the GW.con 1006 is coupled to an invalid Eg 1002.

In some embodiments, a single GW.con may be coupled to one or more Egs and/or GWCLs. In such an embodiment, the pre-authorized transaction identifier is used to allow for asynchronous communications with the one or more Egs and/or GWCLs as the GW.con can issue multiple sets of pre-authorized transaction identifiers, and then wait to receive game world information and associated transactions identifiers in order to process wagering decisions and allocation game world resources.

In some embodiments, the functions of the GWCL 1004 are performed directly by the entertainment game 1002.

Figure 11:
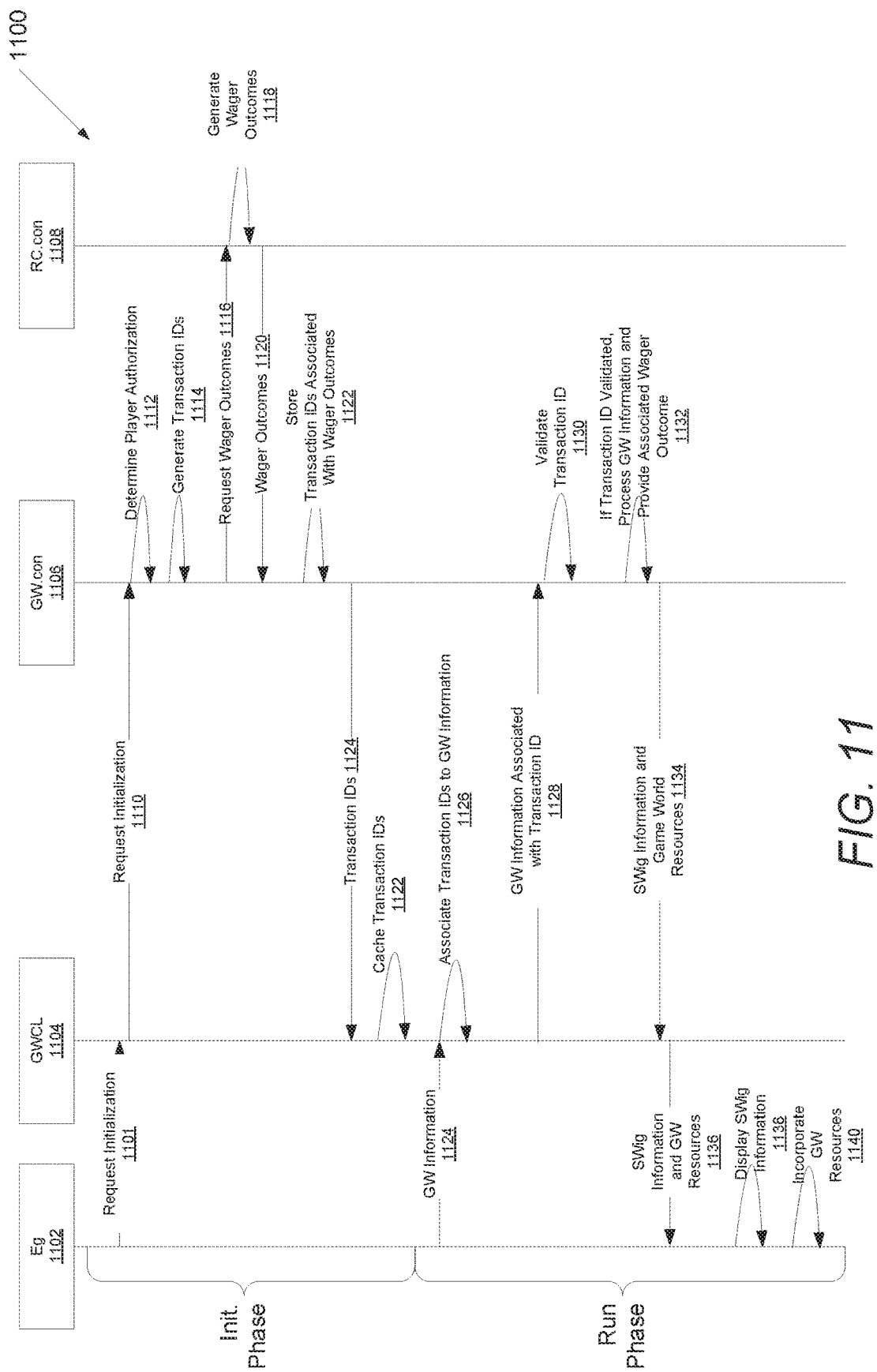
FIG. 11 illustrate a process of pre-computation of wager outcomes for a skill interleaved wagering game in accordance with embodiments of the invention.

FIG. 11 illustrates another process 1100 of pre-authorization of transactions for a skill interleaved wagering game as implemented by a pre-authorized transaction interleaved wagering system in accordance with embodiments of the invention. As depicted in FIG. 11, an entertainment game (Eg) 1102 interfaces with a game world controller (GW.con) 1106 using a game world control layer (GWCL) 1104. In some embodiments, a GWCL 1104 is responsible for providing initial processing for some transactions between the Eg 1102 and the GW.con 1106. In the illustrated process 1100, the GWCL 1104 provides processing for pre-authorized transactions. In the process 1100, in an initialization phase, the Eg 1102 communicates a request for initialization (1101) from the GW.con 1106 through the GWCL 1004 (1110). In some embodiments, the initialization request also includes player information that is used to authenticate a player to the skill interleaved wagering game. The player information can be used, for example, to establish the identity of the player, determine if the player is authorized to play the skill interleaved wagering game, and access account information indicating an account containing real credits that the player will be wagering in the skill interleaved wagering game.

The GW.con 1106 receives the request information 1110 and determines whether the player is authorized to play the skill interleaved wagering game, based on the initialization request (1112). As described herein, the initialization request may include player information used to authenticate the player to the skill interleaved wagering game.

When the player is authorized by the GW.con 1106, the GW.con 1106 communicates a request (1116) for one or more wager outcomes to the RC.con 1108. The RC.con receives the request for one or more wager outcomes and generates (1118) the one or more wager outcomes. The RC.con 1108 communicates the one or more wager outcomes (1120) to the GW.con 1106. The GW.con receives the one or more wager outcomes. The GW.con generates one or more pre-authorized transaction identifiers, associates the one or more pre-authorized transaction identifiers with one or more wager outcomes and stores the generated pre-authorized transaction identifiers for later use (11122). The pre-authorized transaction identifiers and associated wager outcomes may be stored locally or remotely. In some embodiments, each pre-authorized transaction identifier is a unique digital value that is generated by the GW.con 1106. In various embodiments, the unique digital value is unique over a particular domain. By way of example, the domains may include, but are not limited to: an individual gaming session; a player's lifetime of gaming transactions with the operator of the pre-authorized transaction interleaved wagering system; a player's lifetime of gaming transactions with a particular component of the pre-authorized transaction interleaved wagering system (such as the Eg 1102, the GW.con 1106 or the RC.con 1108); and all transactions with pre-authorized transaction interleaved wagering systems.

In some embodiments, the amounts of pre-authorized transaction identifiers and associated wager outcomes that are created may be based upon, but not limited to, factors such as: a type of skill based entertainment game provided by the Eg 1102 (for example, a turn based game may need fewer pre-authorized transaction identifiers than a first person shooter action game); and an amount of real world credit that the player has committed to the pre-authorized transaction interleaved wagering system, with more pre-authorized transaction identifiers being generated the more real world credits the player has committed.

The GW.con 1106 may allocate an amount of pre-authorized transaction identifiers for use by the GWCL 1104 to authorize game world information received from the Eg 1102 and communicated to the GW.con 1106. In some embodiments, the GW.con 1106 may generate a predetermined number of pre-authorized transaction identifiers and allocate all of the generated pre-authorized transaction identifiers for use by the GWCL 1104. In some embodiments, the GW.con 1106 may allocate fewer than all of the generated pre-authorized transaction identifiers to the GWCL 1104 and store the remaining, unallocated pre-authorized transaction identifiers. The unallocated pre-authorized transaction identifiers may be stored locally or remotely.

The GW.con 1106 communicates the allocated amount of generated pre-authorized transaction identifiers to the GWCL 1104 (1124). On receiving the pre-authorized transaction identifiers, the GWCL 1104 caches them for later use (1126).

During a game session phase, a player plays the skill wagering interleaved game provided by the pre-authorized transaction interleaved wagering system. As the player plays the skill wagering interleaved game, game world information is communicated to the GWCL 1104 by the Eg 1102 (1124). The GWCL 1004 receives the game world information and determines if the GWCL 1004 has any pre-authorized transaction identifiers left in the GWCL's 1004 cache (1126). If so, the GWCL 1004 associates a pre-authorized transaction identifier with the game world information.

In various embodiments, the pre-authorized transaction identifiers are associated with specified types of game world information that the GW.con 1106 may base a wager decision upon. The specified types of game world information may include, but are not limited to: in a turn based game, a pre-authorized transaction identifier may be associated to game world information indicating each time a player takes their turn; in a first person shooter game, pre-authorized transaction identifiers may be associated with game world information indicating each virtual round fired from a virtual weapon; in a racing game, pre-authorized transaction identifiers may be associated with an amount of virtual fuel consumed by a virtual car being driven by the player.

In various embodiments, certain game world information may not be associated with a pre-authorized transaction identifier. Game world information may not be associated with a pre-authorized transaction identifier if the game world information does not trigger a wager decision.

In some embodiments, once a pre-authorized transaction identifier is associated with game world information, the pre-authorized transaction identifier is not associated with subsequent game world information. That is, multiple pieces of game world information may not be associated with one common pre-authorized transaction identifier. In some embodiments, a used pre-authorized transaction identifier is removed from the cache of pre-authorized transaction identifiers on the GWCL 1104. In other embodiments, a used pre-authorized transaction identifier is marked with an indicator in the cache as being used.

In the case the GWCL 1104 does not have any additional pre-authorized transaction identifiers left in the GWCL's 1104 cache, the GWCL 1104 may communicate the game world information to the GW.con 1106 without a pre-authorized transaction identifier or with an associated null transaction identifier. In addition, the GWCL 1104 may communicate a request to the GW.con 1106 to generate and allocate more pre-authorized transaction identifiers to send to the GWCL 1104.

The GWCL 1104 communicates the game world information associated with a pre-authorized transaction identifier to the GW.con 1106 (1128). The GW.con 1106 receives the game world information from the GWCL 1104 and makes a determination of whether or not a pre-authorized transaction identifier is associated with the game world information. If a pre-authorized transaction identifier is associated with the received game world information, the GW.con 1106 validates the pre-authorized transaction identifier (1130). In some embodiments, the GW.con 1106 validates the pre-authorized transaction identifier associated with the game world information by determining whether the pre-authorized transaction identifier is stored in the GW.con's 1106 own local data store of pre-authorized transaction identifiers. In some embodiments, the GW.con 1106 validates the pre-authorized transaction identifier by accessing a remote data store of generated pre-authorized transaction identifiers.

If the received pre-authorized transaction identifier is valid, the GW.con 1106 uses the game world information associated with the valid pre-authorized transaction identifier to identify and provide the wager outcome associated with the pre-authorized transaction identifier (1132). In this way, the GW.con 1106 is able to verify the received game world information originated from a valid Eg 1102.

Once the wager outcome is provided, the GW.con 1106 determines game world resources based on the wager outcome. The GW.con 1106 communicates (1134) the determined game world resources and the wager outcome as SWig information to the GWCL 1104, which the GWCL 1104 passes to the Eg 1102 (1136). The Eg receives the game world resources and the SWig information, displays the SWig information (1138) and incorporates the game world resources (1140) into the interactive entertainment game provided by the Eg.

If the game world information is not associated with a pre-authorized transaction identifier, or the pre-authorized transaction identifier cannot be validated, then the GW.con 1106 may make additional processing decisions. In some embodiments, the GW.con 1006 may treat the lack of a valid pre-authorized transaction identifier as an indication that the GW.con 1006 is coupled to an invalid Eg 1002.

In some embodiments, a single GW.con may be coupled to one or more Egs and/or GWCLs. In such an embodiment, the pre-authorized transaction identifier is used to allow for asynchronous communications with the one or more Egs and/or GWCLs as the GW.con can issue multiple sets of pre-authorized transaction identifiers, and then wait to receive game world information and associated transactions identifiers in order to process wagering decisions and allocation game world resources.

In various embodiments, the GWCL 1104 may communicate a request to the GW.con 1106 that all or a portion of the one or more wager outcomes be canceled such that the player may receive a refund for all unused wager outcomes. To do so, the GW.con 1106 determines which of the one or more wager outcomes have not been previously communicated to the GWCL and refunds any RC committed to the wagers corresponding to the wager outcomes.

In some embodiments, the functions of the GWCL 1104 are performed directly by the entertainment game 1102.

While the above description may include many specific embodiments of the invention, these should not be construed as limitations on the scope of the invention, but rather as an example of one embodiment thereof. It is therefore to be understood that the present invention can be practiced otherwise than specifically described, without departing from the scope and spirit of the present invention. Thus, embodiments of the present invention should be considered in all respects as illustrative and not restrictive.

What is claimed is:

1. A gaming system comprising:
a real world credit controller comprising:
- a real world credit meter;
- a random number generator; and
- a real world credit paytable, wherein the real world credit controller is configured to:
  - provide a randomly generated payout of real world credits from a wager of real world credits in a gambling game using the random number generator and the real world credit pay table;
  - augment an amount of real world credits stored in the real world credit meter based on the randomly generated payout of real world credits to the real world credit meter;
  - receive, from a game world operating system controller, a wagering decision to trigger the wager;
  - determine a random number generation result based on the wagering decision to trigger the wager; and
  - provide, to the game world operating system controller, the random number generation result based on the wagering decision to trigger the wager;

a processing device configured to:
- monitor an interactive entertainment game for input of a game world information;
- monitor the interactive entertainment game for input of an initialization request wherein the initialization request is associated with a player;
- provide the game world information and initialization request to the game world operating system controller;

a display screen configured to display at least one of a gambling game result and wager outcomes based upon the game world information;

a user input device configured to receive from the player a wagering amount to use during game play; and the game world operating system controller operatively connected to the real world credit controller and operatively connected to the processing device, the game world operating system controller configured to:
- receive, from the processing device, the initialization request, wherein the initialization request is associated with the player;
- determine whether the player is authorized to play a game, based on the initialization request;
- when the player is authorized, allocate one or more pre-authorized transaction identifiers for use by a game world client wherein the one or more pre-authorized transaction identifiers of a gaming system are used to authorize game world information received from the processing device;
- communicate the allocated one or more pre-authorized transaction identifiers to the game world client;
- receive game world information from the processing device;
- validate the pre-authorized transaction identifier when the received game world information is associated with the pre-authorized transaction identifier; and
- process the received game world information associated with the pre-authorized transaction identifier when the pre-authorized transaction identifier is validated, wherein the processing comprises:
  - making the wagering decision;
  - providing, to the real world credit controller, the wagering decision to trigger the wager;
  - receiving, from the real world credit controller, the random number generation result based on the wagering decision to trigger the wager; and
  - providing, to the processing device, the random number generation results based on the wagering decision to trigger the wager.

2. The gaming system of claim 1, wherein the one or more pre-authorized transaction identifiers is a unique digital value that is generated by the game world operating system controller.

3. The gaming system of claim 2, wherein the one or more pre-authorized transaction identifiers is unique over a particular domain.

4. The gaming system of claim 3, wherein the particular domain is one of: an individual gaming session, the player's lifetime of gaming transactions, and all transactions.

5. The gaming system of claim 1, wherein the game world operating system controller is further configured to:
- generate a plurality of pre-authorized transaction identifiers, wherein the plurality of pre-authorized transaction identifiers comprises the one or more allocated pre-authorized transaction identifiers; and
- store the plurality of pre-authorized transaction identifiers.

6. The gaming system of claim 5, wherein the generating the plurality of pre-authorized transaction identifiers is based on at least one of: a type of entertainment game being played, and the amount of real world credit that the player has committed.

7. The gaming system of claim 1, wherein validating the pre-authorized transaction identifier comprises determining whether the pre-authorized transaction identifier associated with the received game world information is stored in a local data store of pre-authorized transaction identifiers of the game world operating system controller.

8. The gaming system of claim 1, wherein the initialization request comprises player information associated with the player.

9. The gaming system of claim 1, wherein the game world operating system controller is further constructed to:
- determine that the game world operating system controller is coupled to an invalid entertainment game when the received pre-authorized transaction identifier cannot be validated.

10. The gaming system of claim 1, wherein the game world operating system controller is further constructed to:
- determine that the game world operating system controller is coupled to an invalid entertainment game when the received game world information is not associated with a pre-authorized transaction identifier.

* * * * *